(12) United States Patent
Chen et al.

(10) Patent No.: US 12,148,131 B2
(45) Date of Patent: Nov. 19, 2024

(54) GENERATING AN INPAINTED IMAGE FROM A MASKED IMAGE USING A PATCH-BASED ENCODER

(71) Applicant: Microsoft Technology Licensing, LLC, Redmond, WA (US)

(72) Inventors: Dongdong Chen, Redmond, WA (US); Xiyang Dai, Bellevue, WA (US); Yinpeng Chen, Sammamish, WA (US); Mengchen Liu, Redmond, WA (US); Lu Yuan, Redmond, WA (US)

(73) Assignee: Microsoft Technology Licensing, LLC., Redmond, WA (US)

( * ) Notice: Subject to any disclaimer, the term of this patent is extended or adjusted under 35 U.S.C. 154(b) by 382 days.

(21) Appl. No.: 17/733,634

(22) Filed: Apr. 29, 2022

(65) Prior Publication Data

US 2023/0351558 A1 Nov. 2, 2023

(51) Int. Cl.
*G06K 9/40* (2006.01)
*G06T 5/77* (2024.01)
(52) U.S. Cl.
CPC ...... *G06T 5/77* (2024.01); *G06T 2207/20021* (2013.01); *G06T 2207/20076* (2013.01); *G06T 2207/20081* (2013.01); *G06T 2207/20084* (2013.01)
(58) Field of Classification Search
CPC ............. G06T 5/77; G06T 2207/20021; G06T 2207/20076; G06T 2207/20081; G06T 2207/20084; G06T 5/60
See application file for complete search history.

(56) References Cited

U.S. PATENT DOCUMENTS

2018/0374569 A1\* 12/2018 Niculescu-Mizil ... G06F 18/214
2020/0175259 A1\* 6/2020 Noh ..................... G06V 40/172
2021/0304387 A1\* 9/2021 Schroers ................ G06N 3/045

FOREIGN PATENT DOCUMENTS

CN 110399798 A \* 11/2019 ......... G06K 9/00456
CN 111105382 B \* 11/2021 ............... G06N 3/08

OTHER PUBLICATIONS

Han, et al., "A Survey on Vision Transformer", In Repository of arXiv:2012.12556v5, Feb. 23, 2022, pp. 1-23.

(Continued)

*Primary Examiner* — Xin Jia
(74) *Attorney, Agent, or Firm* — Foley IP Law, PLLC

(57) ABSTRACT

The disclosure herein describes generating an inpainted image from a masked image using a patch-based encoder and an unquantized transformer. An image including a masked region and an unmasked region is received, and the received image is divided into a plurality of patches including masked patches. The plurality of patches is encoded into a plurality of feature vectors, wherein each patch is encoded to a feature vector. Using a transformer, a predicted token is generated for each masked patch using a feature vector encoded from the masked patch, and a quantized vector of the masked patch is determined using generated predicted token and a masked patch-specific codebook. The determined quantized vector of the masked patch is included into a set of quantized vectors associated with the plurality of patches, and an output image is generated from the set of quantized vectors using a decoder.

20 Claims, 8 Drawing Sheets

(56) References Cited

OTHER PUBLICATIONS

Issenhuth, et al., "EdiBERT, a generative model for image editing", In Repository of: arXiv:2111.15264v2, Feb. 4, 2022, 15 Pages.
Jam, et al., "A comprehensive review of past and present image inpainting methods", In Journal of Computer vision and image understanding, Nov. 18, 2020, pp. 1-21.
"International Search Report and Written Opinion Issued in PCT Application No. PCT/US23/012757", Mailed Date: Jun. 13, 2023, 12 Pages.
Yang, et al., "High-Resolution Image Inpainting using Multi-Scale Neural Patch Synthesis", In Repository of arXiv:1611.09969v1, Nov. 30, 2016, 9 Pages.
Zheng, et al., "High-Quality Pluralistic Image Completion via Code Shared VQGAN", In Repository of: arXiv preprint arXiv:2204.01931, Apr. 5, 2022, 15 Pages.
Zhao, et al., "Uctgan: Diverse image inpainting based on unsupervised cross-space translation", In Proceedings of 2020 IEEE/CVF Conference on Computer Vision and Pattern Recognition, Jun. 13, 2020, pp. 5740-5749.
Zheng, et al., "Pluralistic image completion", In Proceedings of IEEE/CVF Conference on Computer Vision and Pattern Recognition, Jun. 15, 2019, pp. 1438-1447.
Zhou, et al., "Places: A 10 Million Image Database for Scene Recognition", In Journal of IEEE Transactions on Pattern Analysis and Machine Intelligence, vol. 40, Issue 6, Jun. 1, 2018, pp. 1452-1464.
Zhuoran, et al., "Efficient attention: Attention with linear complexities", In Proceedings of IEEE Winter Conference on Applications of Computer Vision, Jan. 3, 2021, pp. 3530-3538.
Barnes, et al., "PatchMatch: A Randomized Correspondence Algorithm for Structural Image Editing", In Proceedings of ACM Transactions on Graphics, vol. 28, Issue 3, Aug. 3, 2009, 12 Pages.
Bertalmio, et al., "Image inpainting", In Proceedings of the 27th annual conference on Computer graphics and Interactive techniques, Jul. 1, 2000, pp. 417-424.
Bertalmio, et al., "Simultaneous structure and texture image inpainting", In Journal of IEEE transactions on image processing, vol. 12, Issue 8, Aug. 4, 2003, pp. 882-889.
Carion, et al., "End-toend object detection with transformers", In Proceedings of European Conference on Computer Vision, May 27, 2020, pp. 1-26.
Chen, et al., "Generative pretraining from pixels", In Proceedings of the 37th International Conference on Machine Learning, Nov. 21, 2020, 13 Pages.
Chen, et al., "Pix2seq: A language modeling framework for object detection", In Repository of arXiv:2109.10852v2, Sep. 22, 2021, pp. 1-17.
Chen, et al., "Transformer tracking", In Proceedings of IEEE/CVF Conference on Computer Vision and Pattern Recognition, Jun. 20, 2021, pp. 8122-8131.
Child, et al., "Generating Long Sequences with Sparse Transformers", In Repository of arXiv:1904.10509v1, Apr. 23, 2019, 10 Pages.
Criminisi, et al., "Region filling and object removal by exemplar-based image inpainting", In Journal of IEEE Transactions on Image Processing, vol. 13, Issue 9, Aug. 16, 2004, pp. 1200-1212.
Darabi, et al., "Image melding: Combining inconsistent images using patch-based synthesis", In Journal of ACM Transactions on Graphics, vol. 31, Issue 4, Jul. 1, 2012, 10 Pages.
Deng, et al., "Imagenet: A large-scale hierarchical image database", In Proceedings of IEEE Conference on Computer Vision and Pattern Recognition, Jun. 20, 2009, pp. 248-255.
Doersch, Carl, "Tutorial on variational autoencoders", In Repository of arXiv:1606.05908v1, Jun. 19, 2016, pp. 1-22.
Dong, et al., "Cswin transformer: A general vision transformer backbone with cross-shaped windows", In Repository of arXiv:2107.00652v2, Jul. 15, 2021, pp. 1-21.

Efros, et al., "Image Quilting for Texture Synthesis and Transfer", In Proceedings of the 28th Annual Conference on Computer Graphics and Interactive Techniques, Aug. 12, 2001, pp. 341-346.
Esser, et al., "Taming transformers for high-resolution image synthesis", In Proceedings of IEEE/CVF Conference on Computer Vision and Pattern Recognition, Jun. 20, 2021, pp. 12868-12873.
Gatys, et al., "Image Style Transfer Using Convolutional Neural Networks", In Proceedings of 2016 Conference on Computer Vision and Pattern Recognition, Jun. 27, 2016, pp. 2414-2423.
Goodfellow, et al., "Generative Adversarial Nets", In Proceedings of Advances in Neural Information Processing Systems, Dec. 8, 2014, pp. 1-9.
Hays, et al., "Scene completion using millions of photographs", In Journal of ACM Transactions on Graphics, vol. 26, Issue 3, Jul. 29, 2007, 8 Pages.
Heusel, et al., "GANs Trained by a Two Time-Scale Update Rule Converge to a Local Nash Equilibrium", In Proceedings of 31st International Conference on Neural Information Processing System, Dec. 4, 2017, 12 Pages.
Hinton, et al., "Autoencoders, minimum description length, and helmholtz free energy", In Proceedings of the 6th International Conference on Neural Information Processing Systems, Nov. 29, 1993, pp. 3-10.
Ho, et al., "Axial attention in multidimensional transformers", In Repository of arXiv:1912.12180v1, Dec. 20, 2019, pp. 1-11.
Izuka, et al., "Globally and locally consistent image completion", In Journal of ACM Transactions on Graphics, vol. 36, Issue 4, Jul. 20, 2017, 14 Pages.
Johnson, et al., "Perceptual Losses for Real-Time Style Transfer and Super-Resolution", In Proceedings of European Conference on Computer Vision, Oct. 11, 2016, pp. 694-711.
Karras, et al., "A Style-Based Generator Architecture for Generative Adversarial Networks", In Proceedings of 2019 IEEE/CVF Conference on Computer Vision and Pattern Recognition, Mar. 29, 2019, pp. 4396-4405.
Kingma, et al., "Adam: A method for stochastic optimization", In Repository of arXiv:1412.6980v1, Dec. 22, 2014, pp. 1-9.
Kingma, et al., "Auto-encoding variational bayes", In Repository of arXiv:1312.6114v2, Dec. 23, 2013, pp. 1-9.
Liu, et al., "Coherent semantic attention for image inpainting", In Proceedings of IEEE/CVF International Conference on Computer Vision, Oct. 27, 2019, pp. 4169-4178.
Liu, et al., "Image inpainting for irregular holes using partial convolutions", In Proceedings of the European Conference on Computer Vision, Dec. 15, 2018, pp. 85-100.
Liu, et al., "Rethinking image inpainting via a mutual encoder-decoder with feature equalizations", In Proceedings of 16th European Conference on Computer Vision, Aug. 23, 2020, pp. 1-16.
Loshchilov, et al., "Decoupled Weight Decay Regularization", In Repository of arXiv:1711.05101v3, Jan. 4, 2019, pp. 1-19.
Nazeri, "EdgeConnect: Generative Image Inpainting with Adversarial Edge Learning", In Repository of arXiv:1901.00212v3, Jan. 11, 2019, pp. 1-17.
Oord, et al., "Neural discrete representation learning", In Proceedings of the 31st International Conference on Neural Information Processing Systems, Dec. 4, 2017, pp. 1-10.
Oord, et al., "Pixel recurrent neural networks", In Proceedings of the 33rd International Conference on International Conference on Machine Learning, vol. 48, Jun. 19, 2016, 10 Pages.
Pathak, et al., "Context encoders: Feature learning by inpainting", In Proceedings of IEEE Conference on Computer Vision and Pattern Recognition, Jun. 27, 2016, pp. 2536-2544.
Qiu, et al., "Semanticadv: Generating adversarial examples via attribute-conditioned image editing", In Proceedings of European Conference on Computer Vision, Aug. 23, 2020, pp. 1-19.
Radford, et al., "Language models are unsupervised multitask learners", In Journal of OpenAI blog, vol. 1, Issue 8, Feb. 24, 2019, 24 Pages.
Ramesh, et al., "Zero-shot text-to-image generation", In Repository of arXiv:2102.12092v2, Feb. 26, 2021, 20 Pages.
Razavi, et al., "Generating Diverse High-Fidelity Images with VQ-VAE-2", In Journal of Advances in neural Information processing systems, vol. 32, Dec. 8, 2019, pp. 1-11.

(56) References Cited

OTHER PUBLICATIONS

Sun, et al., "Moiré Photo Restoration Using Multiresolution Convolutional Neural Networks", In Journal of IEEE Transactions on Image Processing, vol. 27, Issue 8, May 9, 2018, pp. 4160-4172.

Van Den Oord, et al., "Conditional image generation with PixelCNN decoders", In Proceedings of 30th Conference on Neural Information Processing Systems, Dec. 5, 2016, pp. 1-9.

Vaswani, et al., "Attention is all you need", In Journal of Advances in neural information processing systems, vol. 30, Dec. 4, 2017, pp. 1-11.

Wan, et al., "High-fidelity pluralistic image completion with transformers", In Repository of arXiv:2103.14031v1, Mar. 25, 2021, 10 Pages.

Wang, et al., "Cnn-generated images are surprisingly easy to spot . . . for now", In Proceedings of IEEE/CVF Conference on Computer Vision and Pattern Recognition, Jun. 13, 2020, pp. 8692-8701.

Wang, et al., "Linformer: Self-Attention with Linear Complexity", In Repository of arXiv:2006.04768v3, Jun. 14, 2020, pp. 1-12.

Wang, et al., "Transformer Meets Tracker: Exploiting Temporal Context for Robust Visual Tracking", In Proceedings of IEEE/CVF Conference on Computer Vision and Pattern Recognition, Jun. 20, 2021, pp. 1571-1580.

Yu, et al., "Diverse image inpainting with bidirectional and autoregressive transformers", In Repository of arXiv:2104.12335v3, Jun. 1, 2021, 11 Pages.

Yu, et al., "Free-Form Image Inpainting with Gated Convolution", In Proceedings of IEEE/CVF International Conference on Computer Vision, Oct. 27, 2019, pp. 4470-4479.

Yu, Jiahui, "Generative Image Inpainting with Contextual Attention", In proceedings of IEEE/CVF Conference On Computer Vision And Pattern Recognition, Jun. 18, 2018, pp. 5505-5514.

Zhan, et al., "supervised scene deocclusion", In Proceedings of IEEE/CVF Conference on Computer Vision and Pattern Recognition, Jun. 13, 2020, pp. 3783-3791.

Zhang, et al., "The Unreasonable Effectiveness of Deep Features as a Perceptual Metric", In Proceedings of IEEE/CVF Conference on Computer Vision and Pattern Recognition, Jun. 18, 2018, pp. 586-595.

* cited by examiner

GENERATING AN INPAINTED IMAGE FROM A MASKED IMAGE USING A PATCH-BASED ENCODER

BACKGROUND

Transformers have been used to achieve success in pluralistic image inpainting thanks to having capabilities of long-term relationship modeling and global structure understanding that are superior to other methods, such as convolutional neural networks (CNNs). However, transformer-based solutions regard each pixel as a token and thus suffer from information loss. First, such solutions must downsample the input images into lower resolutions to maintain computational efficiency, which incurs information loss and misalignment of the boundaries of masked regions. Second, such solutions quantize pixels to quantized pixels, which results in more information loss.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

A computerized method for generating an inpainted image from a masked image is described. An image including a masked region and an unmasked region is received, and the received image is divided into a plurality of patches including masked patches, wherein the masked patch includes at least a portion of the masked region of the image. The plurality of patches is encoded into a plurality of feature vectors, wherein each patch is encoded to a feature vector. A predicted token is generated for each masked patch using a feature vector encoded from the masked patch, wherein the feature vector is unquantized, and a quantized vector of the masked patch is determined using generated predicted token and a masked patch-specific codebook. The determined quantized vector of the masked patch is included into a set of quantized vectors associated with the plurality of patches, and an output image is generated from the set of quantized vectors using a decoder, whereby the output image includes image inpainting in a region corresponding to the masked region in the received image.

BRIEF DESCRIPTION OF THE DRAWINGS

The present description will be better understood from the following detailed description read in light of the accompanying drawings, wherein:

Corresponding reference characters indicate corresponding parts throughout the drawings. In FIGS. 1 to 8, the systems are illustrated as schematic drawings. The drawings may not be to scale.

DETAILED DESCRIPTION

Figure 1:
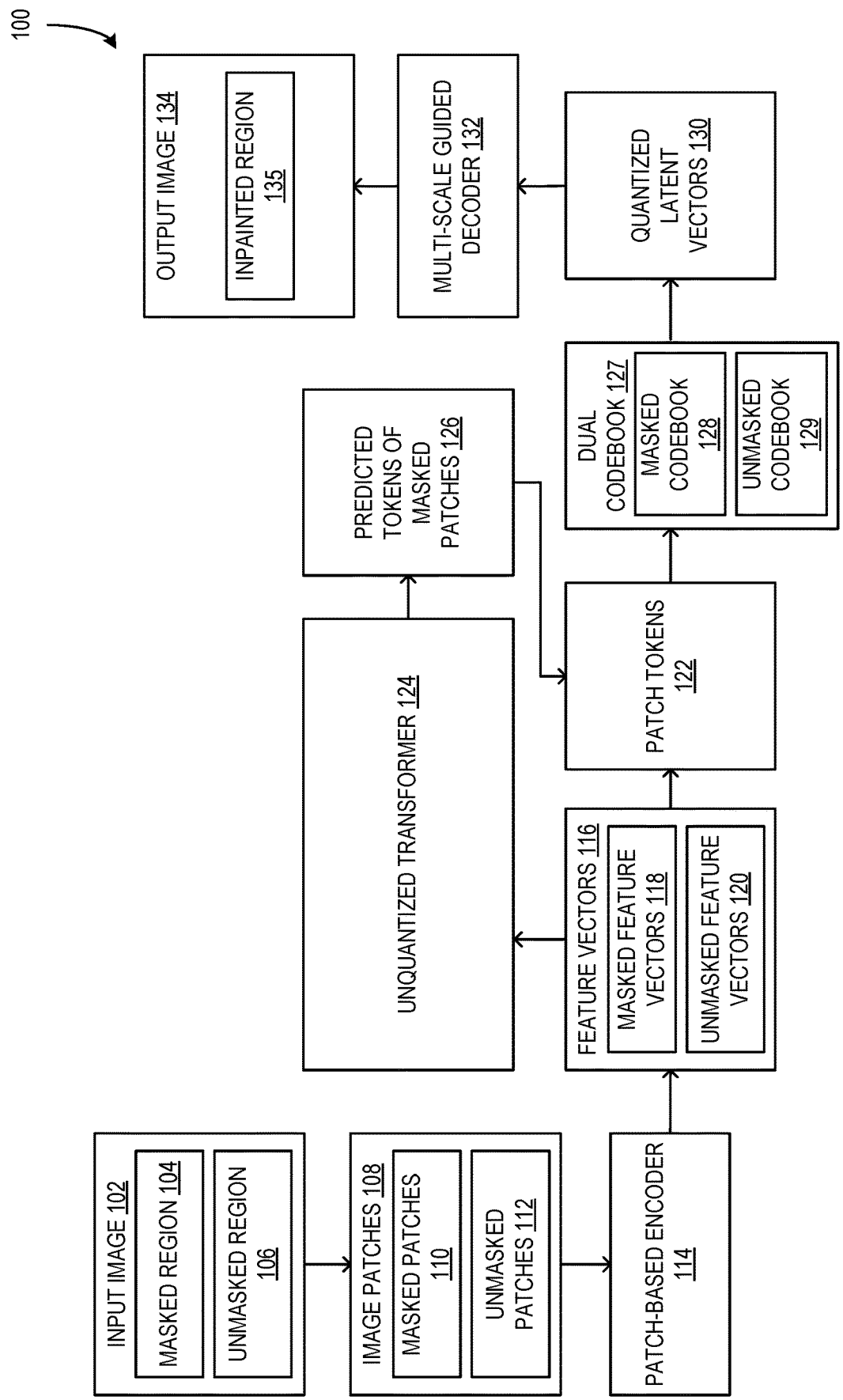
FIG. 1 is a block diagram illustrating a system configured to analyze an input image with a masked region and an unmasked region and generate an output image with an inpainted region corresponding to the masked region.

Aspects of the disclosure provide a computerized method and system for generating inpainted image information in images that include masked regions. The disclosure processes input images in non-overlapping patches, where patches that include some portion of a masked region are masked patches and patches that include only unmasked regions. The masked input image is first encoded to obtain the patch-based feature vectors. Then the patch-based feature vectors are transformed into predicted tokens (i.e., indices) of latent vectors in a set of tokens mapped to latent vectors that is specific to masked regions. The resulting latent vectors are used as the quantized vectors for the masked patches, where quantized vectors are vectors selected from the limited set of vectors based on input vectors that are from a relatively larger, less limited set, such as the feature vectors generated by the patch-based encoding process. The quantized latent vectors are reconstructed into inpainted image information in the output image (e.g., predicted image information for the masked patches). Unmasked patches are used in the output image without changes.

The disclosure operates in an unconventional manner at least by performing operations on patches of the input image, where a patch is a subsection or subpart of an image. The division of the input image into patches enables the disclosure to refrain from quantizing the resulting vectors before transforming them into tokens. Quantizing vectors results in information loss, which is avoided by the disclosed systems and methods. The disclosure avoids downsampling (e.g., reducing the storage size of the image at the cost of losing some data details of the image) while maintaining computational efficiency by processing the input image as a series of non-overlapping multi-pixel patches (rather than as individual pixels or other similar methods).

Methods that use pixel-based tokens cause the associated transformer-based solutions to suffer from information loss in two ways: lower resolution image data is required to avoid high computational complexity at the transformer, so the input image is downsampled into a lower resolution to reduce the quantity of input tokens, which incurs information loss and introduces misalignment of boundaries of the masked regions when upsampled back to the original resolution; and quantization of pixels (e.g., 256 pixels with data values for each of Red, Blue, and Green are reduced to much lower data quantity through clustering) to constrain the prediction space of the transformer and use of those quantized pixels as discrete tokens for input and prediction targets of the transformer, which also incurs further information loss. The disclosure mitigates these issues through the use of patch-based encoding (e.g., using the Patch-based Vector Quantized Variational Auto-Encoder (P-VQVAE)) and transformation processes applied to feature vectors that are not quantized as described herein.

In some examples, the described patch-based encoding processes encode the data of each non-overlapping patch such that disturbance between overlapping image data of masked regions and unmasked regions is avoided. This separate, more accurate treatment of masked regions and unmasked regions is further enabled by managing the mapping of encoded vectors of masked regions and unmasked regions separately, such as by using the dual codebook of the P-VQVAE, which include a masked codebook that is specifically tuned for masked patches and an unmasked codebook that is specifically tuned for unmasked patches.

In some such examples, the dual codebook further represents the prediction space of the associated transformer and is used with the encoded feature tokens of the patches to determine quantized latent vectors that best fit with each patch as described herein.

Additionally, the disclosed systems and methods are configured to iteratively sample predicted tokens for masked patches, using latent vectors based on determined tokens to determine predicted tokens for other masked patches in later iterations. This enables the disclosure to iteratively process masked patches and to determine tokens efficiently and accurately for patches that have little or no unmasked information present by first determining latent vectors for surrounding masked patches.

Further, in some examples, the latent vectors generated during the described process are decoded to generate inpainted patches to replace masked regions of the input image while leaving the unmasked regions unchanged, where "inpaint" means to repair or restore portions of an image that have been masked, in this case, or otherwise disrupted or destroyed. In some such examples, the decoding processes include two branches, a main branch and a reference branch, which enables the use of available data of the reference image throughout the decoding processes to increase the accuracy of the resulting output image.

FIG. 1 is a block diagram illustrating a system 100 configured to analyze an input image 102 with a masked region 104 and an unmasked region 106 and generate an output image 134 with an inpainted region 135 corresponding to the masked region 104. The system 100 is configured to divide the input image 102 into image patches 108, generate feature vectors 116 of the patches 108, transform the masked feature vectors 118 to determine patch tokens 122 of the masked feature vectors 118, generate quantized latent vectors 130 from the patch tokens 122, and decode the quantized latent vectors 130 into the output image 134 with the inpainted region 135. In some examples, the system 100 includes a Patch-based Vector Quantized Variational Auto-Encoder (P-VQVAE) which includes the patch-based encoder 114, the unquantized (UQ) transformer 124, the dual codebook 127, and the Multi-Scale Guided (MSG) decoder 132. In other examples, the system 100 includes more, fewer, and/or different components without departing from the description.

The input image 102 includes a file or other data structure that store image data that is representative of the appearance of the input image 102. In some examples, the image data includes data associated with each pixel of the input image 102. For instance, in an example, image data of each pixel includes a red data value, a green data value, and a blue data value (e.g., Red-Green-Blue (RGB) data).

Further, the input image 102 includes a masked region 104 and an unmasked region 106. In other examples, the input image 102 includes more or different masked regions 104 and/or unmasked regions 106 without departing from the description. In some examples, the masked region 104 and/or unmasked region 106 are identified using mask data included with the input image 102 that indicates whether particular pixels of the input image 102 are in the masked region 104 or the unmasked region 106. For instance, the mask data includes a bit for each pixel of the input image with a '1' bit value indicating that the pixel is in the unmasked region and a '0' bit value indicating that the pixel is in the masked region.

The input image 102 is divided into image patches 108, including masked patches 110 and unmasked patches 112. In some examples, the image 102 is divided into a plurality of patches which are squares or rectangles of identical shape and/or size. For instance, in an example, the height and width of the input image 102 are divided into eight equal section each, dividing the input image 102 into 64 patches with ⅛th height and width of the input image 102. Further, in some examples, the image patches 108 are identified by coordinates within the input image 102 (e.g., a patch in the top left corner of the image is (0, 0), the patch immediately to the right of patch (0, 0) is (0, 1), and the patch immediately below patch (0, 0) is (1, 0)). Patches 108 are masked patches 110 if they include any portion of the masked region 104 and they are unmasked patches 112 if they do not include any portion of the masked region 104 (e.g., if one or more pixels of a patch are masked according to the mask data, the patch is a masked patch 110).

Dividing the input image 102 into image patches 108 enables the system 100 to perform efficiently perform transformations on associated vectors without quantizing those vectors. Because there are fewer patches than there are pixels, the computational complexity of performing transformations on patches is substantially lower than other methods that perform transformations on the pixel level. This computational complexity reduction enables the system 100 to avoid information loss through quantization as described herein.

In some examples, the system 100 includes a patch-based encoder 114. The patch-based encoder 114 includes hardware, firmware, and/or software configured to generate feature vectors 116 from the image patches 108, where a feature vector 116 is generated for each image patch 108. The patch-based encoder 114 is configured to process the input image 102 as separate patches 108 (e.g., the image is processed in several linear layers of non-overlapped patches of the image). Further, the generation of the feature vectors 116 based on the patches 108 includes flattening the data of each patch and then mapping the flattened patch data into a feature vector (e.g., using an encoding function of the patch-based encoder 114).

The feature vectors 116 are data vectors that are representative of each patch 108 that are generated by the encoding processes (e.g., of the patch-based encoder 114) as described herein. In some examples, the feature vectors 116 further include information that identifies each feature vector 116 as either a masked feature vectors 118 or an unmasked feature vector 120. Masked feature vectors 118 are vectors generated based on masked patches 110 and unmasked feature vectors 120 are vectors generated based on unmasked patches 112. The masked feature vectors 118 are provided as input to be transformed into predicted tokens 126 as described herein (e.g., by the UQ transformer 124) and the unmasked feature vectors 120 are used to generate patch tokens 122 (e.g., using an unmasked codebook 129). The masked feature vectors 118 are converted into patch tokens 122 using the UQ transformer 124 as described further below. See equation 1 provided in the exemplary equations section below for a formal representation of the feature vectors 118.

In some examples, the patch tokens 122 are data values that represent entries in a set of token values mapped to latent vectors, such as the dual codebook 127. In some such examples, the dual codebook 127 includes a masked codebook 128 that includes mappings of token values to quantized latent vectors 130 that have been determined based on masked feature vectors 118 during a training process as described below. Further, the dual codebook 127 includes an unmasked codebook 129 that includes mappings of token values to quantized latent vectors 130 that have been determined based on unmasked feature vectors 120 during the training process as described below. The quantized latent vectors 130 are "latent" in that they are not defined but are generated via a training process and "quantized" in that they make up a limited set of vectors in the codebook 127 that are used to translate from the feature vectors 116 as described herein. Each feature vector 116 is translated or otherwise converted into a patch token 122 in some manner (e.g., identifying a quantized latent vector to which the feature vector is closest and assigning the token mapped to the identified quantized latent vector to the feature vector as its patch token 122). In other examples, other methods of mapping feature vectors to latent vectors for use in decoding are used without departing from the description.

In some examples, the system 100 includes a UQ transformer 124. The UQ transformer 124 includes hardware, firmware, and/or software configured to transform masked feature vectors 118 into predicted tokens 126 of the associated masked patches. In some examples, the UQ transformer 124 is trained to perform these transformations using machine learning as described herein. Further, generation of the predicted tokens 126 includes generating data values indicative of strength or likelihood of the predictions, such that the data values enable the most likely predicted tokens 126 to be used. For instance, for each masked feature vector 116 being analyzed, the UQ transformer 124 generates a predicted token value and a likelihood that the predicted token value is accurate (e.g., a value of 0.75 indicating a 75% likelihood of accuracy). Additionally, or alternatively, the UQ transformer 124 generates multiple predicted token values for each masked feature vector 118 and each of the multiple predicted token values has an associated likelihood value, such that a most likely predicted token value can be selected for the masked feature vector 118.

Further, in some examples, the predicted tokens 126 generated by the UQ transformer 124 can be used in an iterative process during analysis of other masked feature vectors 118 as described in greater detail below.

In other examples, other types of transformers or entities configured to perform transformation processes are used in place of or in conjunction with the UQ transformer 124 without departing from the description.

The quantized latent vectors 130 are obtained from the dual codebook 127 using the patch tokens 122 for each of the feature vectors 116 as described above. Each of the quantized latent vectors 130 is determined using a training process as described below. The quantized latent vectors 130 are representative of patches of image data and can be decoded using the MSG decoder 132 to generate an output image 134. Quantized vectors are used due to using the dual codebook 127 with limited vector entries to translate feature vectors from the patch-based encoder 114, which can generate an effectively unlimited quantity of different vectors.

In some examples, the system 100 includes an MSG decoder 132. The MSG decoder 132 includes hardware, firmware, and/or software configured to decode the quantized latent vectors 130 to generate the output image 134 with the inpainted region 135 that replaces the masked region 104. In some examples, the MSG decoder 132 is configured to generate the inpainted image data from the quantized latent vectors 130 using deconvolutional layers and further using a reference process to extract multi-scale feature maps from the input image 102, where the feature maps are combined with the deconvolutional process using Mask Guided Addition (MGA) module. The MSG decoder 132 is described in greater detail below with respect to FIG. 5.

In such examples, the output image 134 is generated by the MSG decoder 132. In some examples, the output image 134 includes an inpainted region 135 that replaces the masked region 104 of the input image 102. The unmasked region 106 of the input image 102 remains unchanged in the output image 134. In this way, the system 100 has generated the output image 134 in such a way that the appearance of the portion of the input image 102 that is covered by the masked region 104 is predicted in the form of the inpainted region 135.

In other examples, the system includes other decoders and/or entities configured to perform decoding processes in place of or in conjunction with the MSG decoder 132 without departing from the description.

Figure 2:
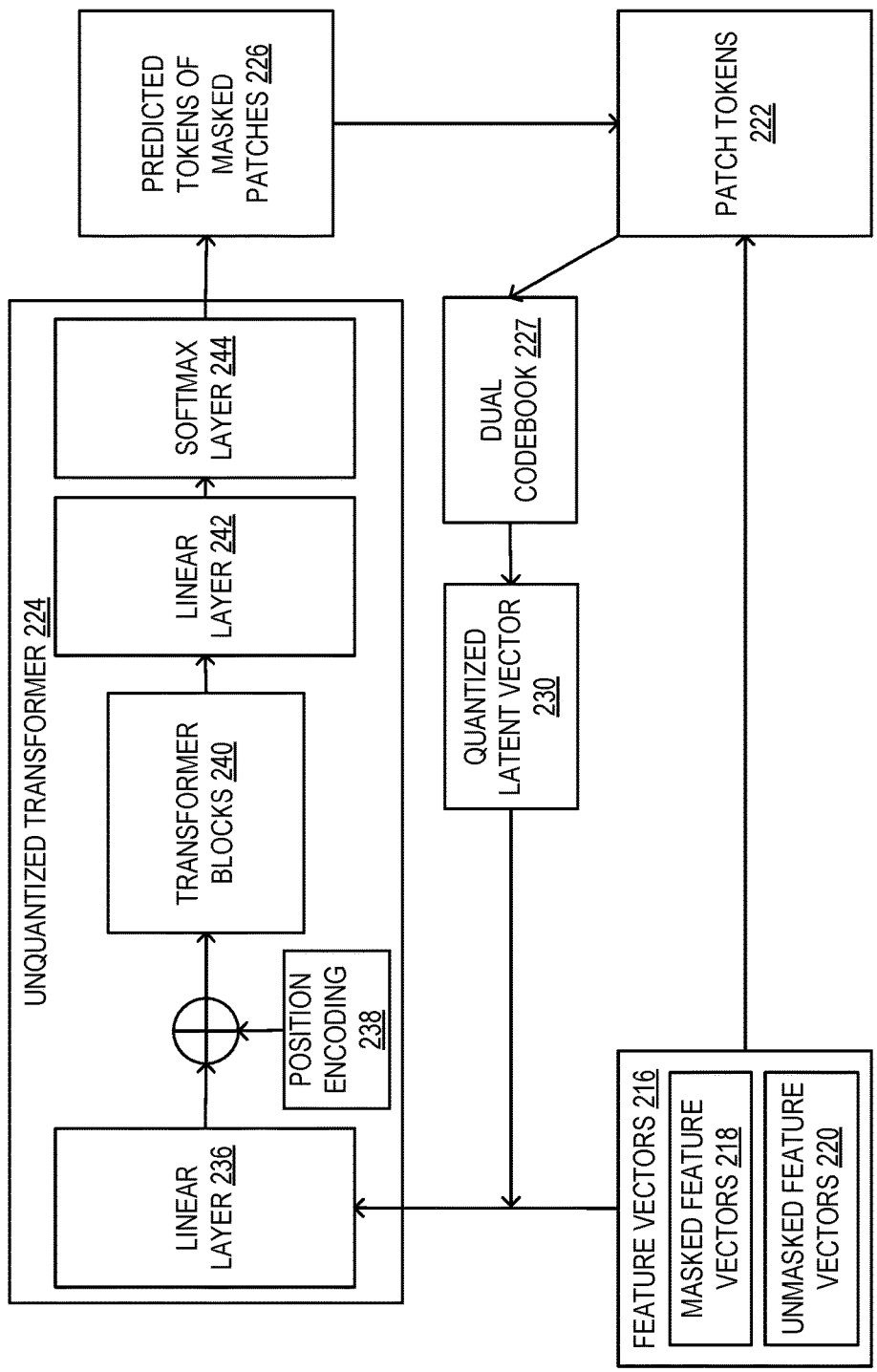
FIG. 2 is a block diagram illustrating a system including an unquantized transformer configured to generate predicted tokens of unmasked patches based on masked feature vectors.

FIG. 2 is a block diagram illustrating a system 200 including an UQ transformer 224 configured to generate predicted tokens 226 of unmasked patches based on masked feature vectors 218. In some examples, the system 200 is part of or otherwise included in a system such as system 100 of FIG. 1. It should be understood that, while the system 200 includes a UQ transformer 224 as illustrated, in other examples, other types of transformers and/or entities configured to perform transformation processes are used in the system 200 without departing from the description.

The unmasked feature vectors 220 are used to generate patch tokens 222 that are associated with unmasked patches (e.g., a feature vector is compared to the quantized latent vectors of the unmasked codebook 129, the quantized latent vector closest to the feature vector is selected, and the patch token 222 associated with the selected quantized latent vector is used as the token associated with the feature vector), but the masked feature vectors 218 are transformed or otherwise analyzed in the UQ transformer 224. The UQ transformer 224 is configured to transform the feature vectors, which are unquantized, into predicted discrete tokens 226 for masked patches of the input image. Because the transformer 224 is configured to use the unquantized feature vectors 216 as input, information loss due to quantization is avoided at this point in the process, enabling more accurate determination of patch tokens 222 for the masked feature vectors 218.

In some examples, the feature vectors 216 are mapped by a linear layer 236 and then added or otherwise combined with extra position encoding 238 (e.g., learnable position embeddings for the encoding of spatial information. Then, the data is flattened along spatial dimensions to obtain input data for the transformer blocks 240. The transformer blocks 240 are trained to perform the vector data transformation process using machine learning processes. The output of the transformer blocks 240 are then projected to the distribution over the latent vector entries in the dual codebook 227 using a linear layer 242 and a SoftMax layer 244. An example process of the UQ transformer 224 is described formally by equation 2 provided in the exemplary equations section below.

Further, in some examples, the training of the transformer 224 is performed using machine learning techniques. Given a masked input image, the distribution of the corresponding tokens associated with masked regions of the image over K latent vectors is obtained with a pre-trained encoder function and unquantized transformer function in the form of $\hat{p}=T(\epsilon(\hat{x}))$. The ground truth tokens used during the training of the transformer 224 are generated using an encoding function on the patches of a reference image where all the patches are unmasked. In some examples, the generation of the ground truth tokens is represented formally by equation 3 provided in the exemplary equations section below.

Additionally, or alternatively, the UQ transformer 224 is trained with a cross-entropy loss function. In some examples, the cross-entropy loss function is formally represented by equation 4 provided in the exemplary equations section below. In order to make the training stage consistent with the inference stage (e.g., the runtime stage), where only the quantized vectors (e.g., quantized latent vectors 130) can be obtained for masked patches, the feature vectors provided to the transformer 224 during training are randomly quantized to latent vectors in the dual codebook 227 (e.g., with a probability of 0.3 or another selected probability value) before providing the vectors to the transformer 224 during training.

Further, in some examples, the UQ transformer 224 and/or other vector transforming processes described herein are configured to operate iteratively using sampled tokens (e.g., using Gibbs sampling). During each iteration of generating predicted tokens 226, the masked patch associated with the highest probability predicted token(s) 226 is selected. The token for the selected patch is sampled from a subset of the predicted tokens with the highest probability values using Gibbs sampling. The latent vector associated with the sampled token in the dual codebook 227 (e.g., the unmasked codebook 129 of the dual codebook) is obtained and that latent vector is used to replace the feature vector of the selected patch in the set of feature vectors being used by the transformer 224. The transformer 224 is used to perform another iteration to generate predicted tokens 226 that are further based on the replacement latent vector. After sampling tokens for all masked patches, such that the set of patch tokens 222 is complete, all quantized latent vectors are obtained based on the dual codebook 227 and those vectors are used to generate an output image using a decoder (e.g., MSG decoder 132).

Figure 3:
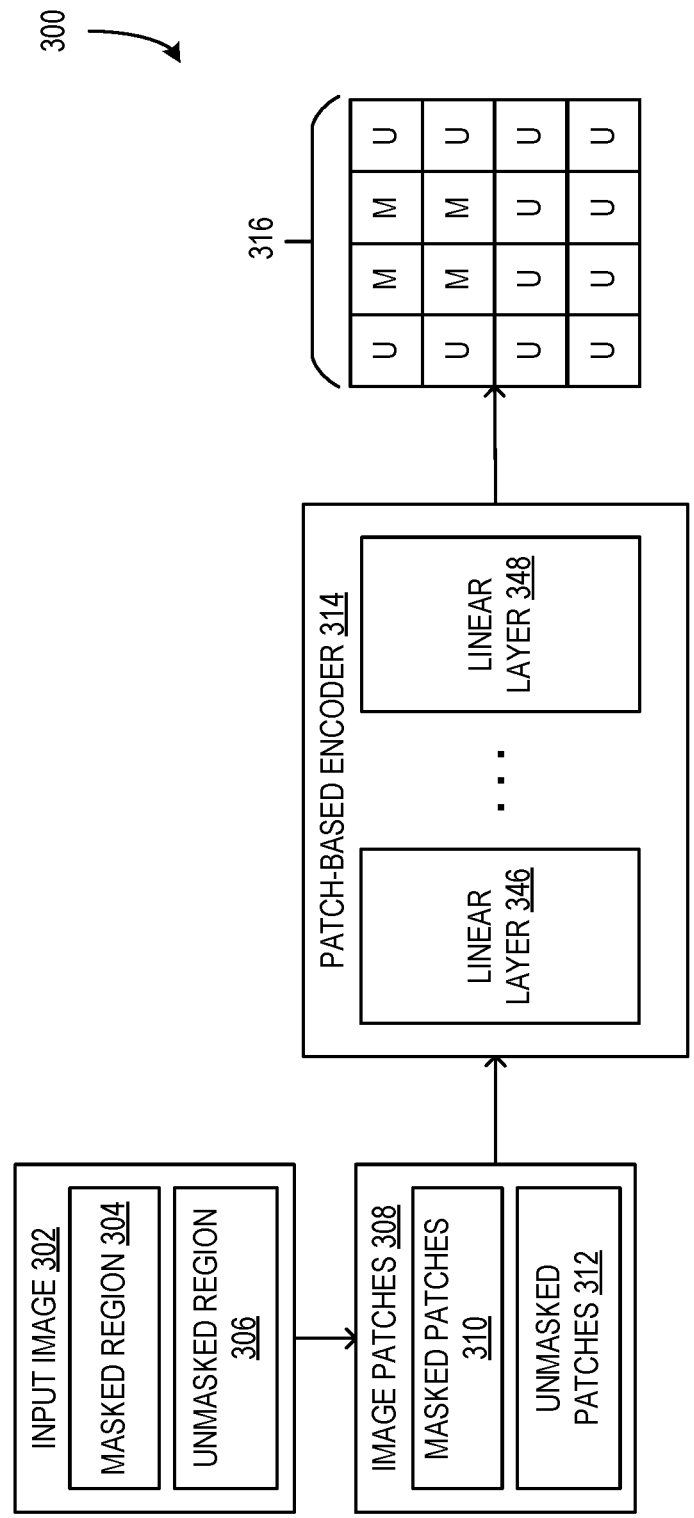
FIG. 3 is a block diagram illustrating a system including a patch-based encoder configured to generate feature vectors from patches of an input image.

FIG. 3 is a block diagram illustrating a system 300 including a patch-based encoder 314 configured to generate feature vectors 316 from patches 308 of an input image 302. In some examples, the system 300 is part of or otherwise included in a system such as system 100 of FIG. 1. In some examples, the patch-based encoder 314 is part of a Patch-based Vector Quantized Variational Auto-Encoder (P-VQ-VAE) (e.g., the P-VQVAE including the patch-based encoder, the dual codebooks for vector quantization, and the MSG decoder). It should be understood that, while the system 300 as illustrated includes the patch-based encoder 314, in other examples, other types of encoders and/or entities configured to perform encoding processes are used in system 300 without departing from the description.

The input image 302 with the masked region 304 and unmasked region 306 is divided into image patches 308, including masked patches 310 and unmasked patches 312 as described herein. The patches 308 are provided to the patch-based encoder 314 that is configured to encode the image data of the patches 308 to generate the feature vectors 316, with one feature vector 316 being generated for each patch 308. In some examples, the encoder function includes a plurality of linear layers 346-348 that are used to process the image patches. Linear layers 346-348 are fully connected layers, meaning that every output of a layer is connected to, or influences, every input of the next layer. The data of an image patch is passed through each layer of the linear layers 346-348 in a defined order to encode that data into feature vectors 316. The feature vectors 316 are illustrated as a grid of vectors that are in grid locations associated with the positions of associated patches 308 in the input image 302 (e.g., the top left feature vector 316 is associated with the top left patch 308 of the input image 302). Further, the feature vectors 316 are labeled with 'U' if they are associated with unmasked patches 312 and with 'M' if they are associated with masked patches 310. As illustrated, it is shown that the masked region 304 of the input image 302 includes four patches 308 in the top middle of the input image 302.

Figure 4:
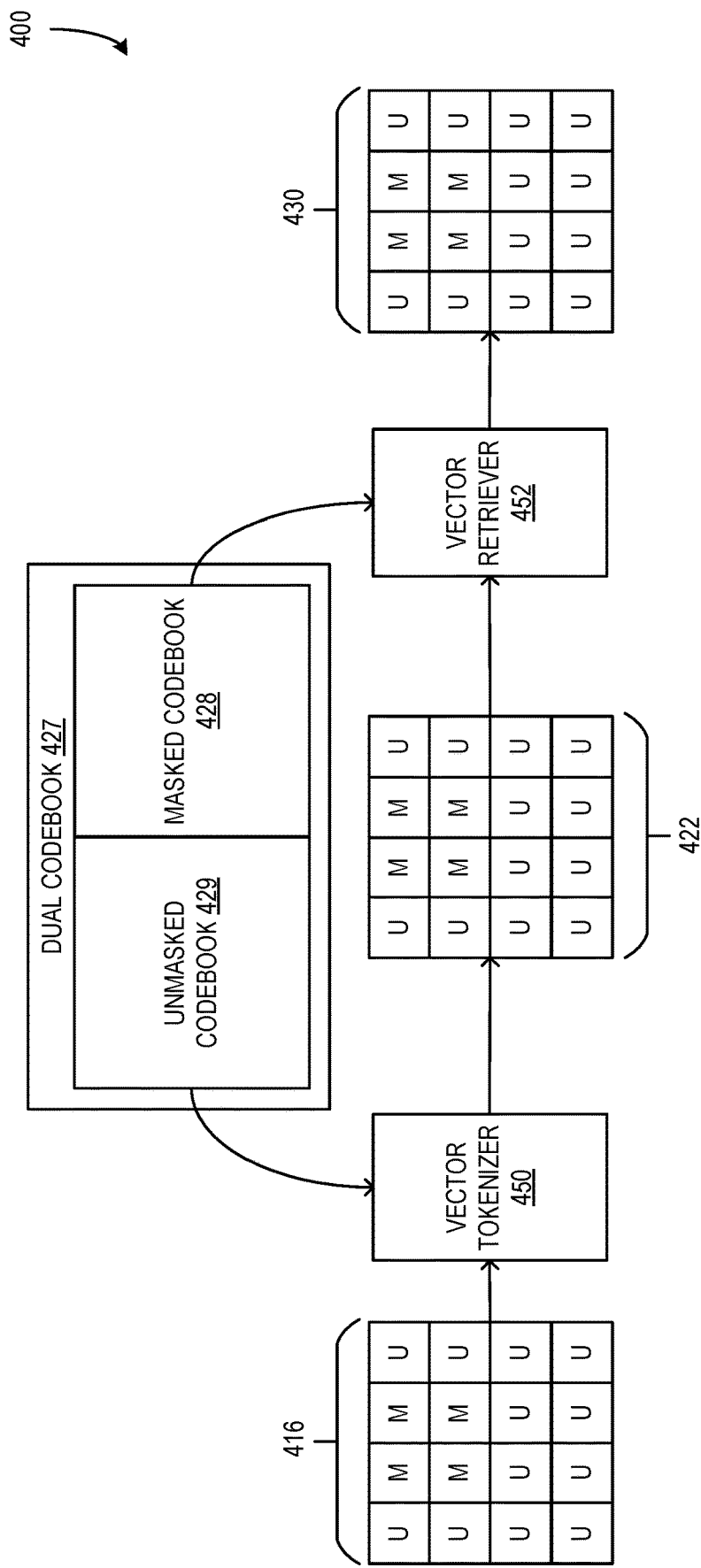
FIG. 4 is a block diagram illustrating a system including a dual codebook configured to enable separate treatment of masked and unmasked feature vectors.

FIG. 4 is a block diagram illustrating a system 400 including a dual codebook 427 configured to enable separate treatment of masked and unmasked feature vectors 416. In some examples, the system 400 is part of or otherwise included in a system such as system 100 of FIG. 1. It should be understood that, while the system 400 as illustrated includes the dual codebook 427, in other examples, other types of codebooks and/or sets of token-mapped latent vectors are used in the system 400 without departing from the description.

In some examples, the dual codebook 427 is configured to enable the feature vectors 416 to be quantized or otherwise mapped into discrete patch tokens 422 via a vector tokenizer 450. Further, the dual codebook 427 is configured to enable patch tokens 422 to be mapped to quantized latent vectors 430 by a vector retriever 452. The dual codebook 427 is divided into two separate codebooks: a masked codebook 428 and an unmasked codebook 429. The masked codebook 428 (represented as $e' \in \mathbb{R}^{K' \times C}$) is configured to map token values to latent vectors based on masked feature vectors and the unmasked codebook 429 (represented as $e \in \mathbb{R}^{K \times C}$) is configured to map token values to latent vectors based on unmasked feature vectors. K and K' are the number of latent vectors in the unmasked codebook 429 and the masked codebook 428, respectively.

Further, an indicator mask that indicates whether a patch or an associated feature vector is masked or unmasked is represented as $$m^L \in \{0, 1\}^{\frac{H}{r} \times \frac{W}{r} \times 1},$$

where a value of 0 indicates the patch is masked and a value of 1 indicates the patch is unmasked. In some examples, a feature vector $\hat{f}_{i,j}$ is quantized or otherwise mapped to a latent vector of the dual codebook 427 using equation 5 provided in the exemplary equations section below. During the process of training elements of the system, such as the patch-based encoder 114 or 314, the dual codebook 427 is configured to enable the learning of more discriminative feature vectors for masked and unmasked patches due to the feature vectors being quantized and/or otherwise represented with different codebooks. This further disenchants the transformer with respect to the masked and unmasked patches to enable prediction of more reasonable results for masked patches.

Figure 5:
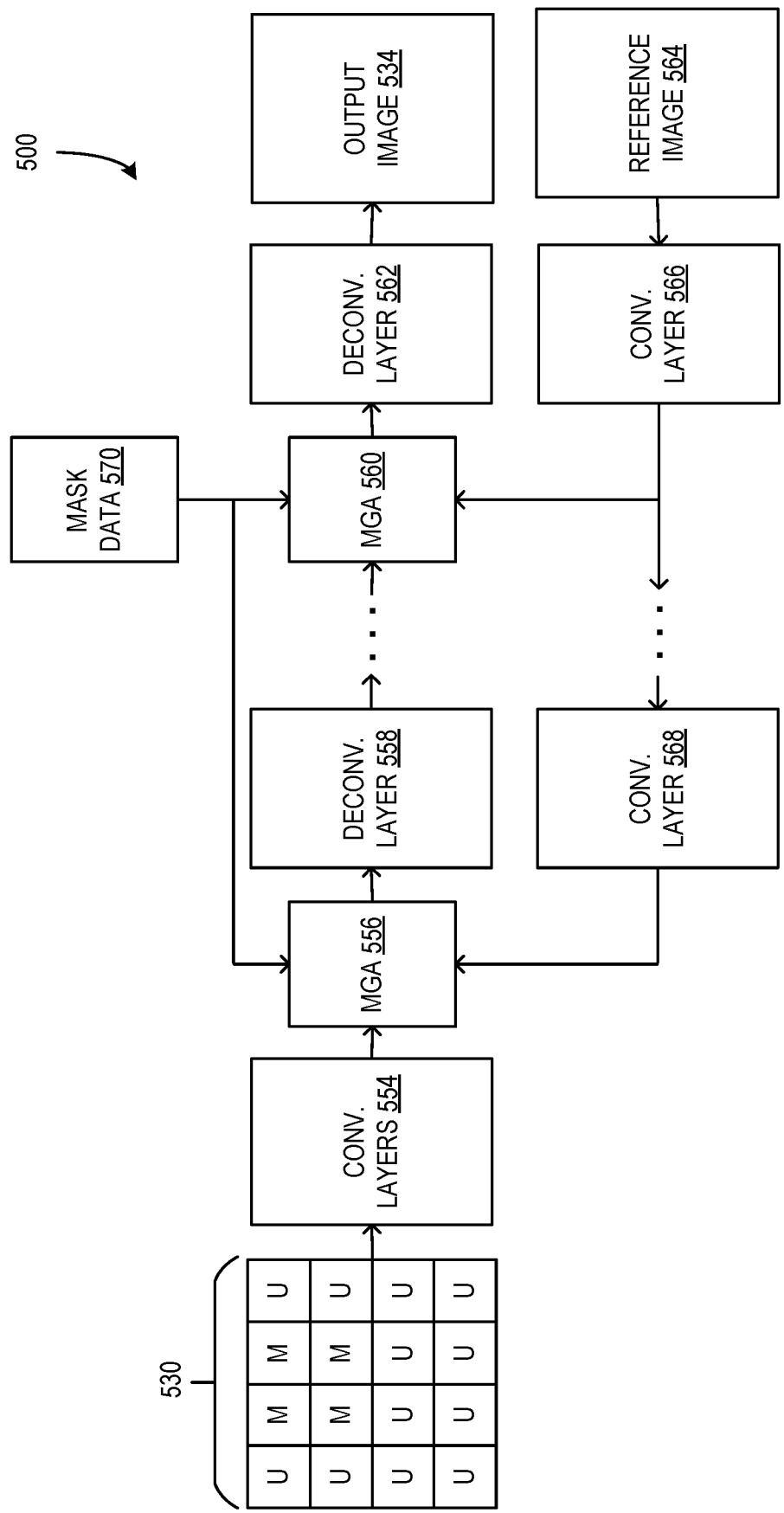
FIG. 5 is a block diagram illustrating a system including a multi-scale guided decoder configured to decode latent vectors into an output image.

FIG. 5 is a block diagram illustrating a system 500 including an MSG decoder (e.g., MSG decoder 132) configured to decode latent vectors 530 into an output image 534. In some examples, the system 500 is included in or otherwise a part of a system such as system 100 of FIG. 1. It should be understood that, while the system 500 as illustrated includes the MSG decoder, in other examples other types of decoders and/or entities configured to perform decoding processes are included in the system 500 without departing from the description.

The latent vectors 530 are processed using convolutional layers 554 and then several deconvolutional layers 558-562 are applied to generate the output image 534 via a main branch of the decoder. Further, the decoder includes a reference branch that extracts multi-scale feature maps (with spatial sizes $$\frac{H}{2^l} \times \frac{W}{2^l}, 0 \le l \le \log_2 r)$$

from a reference image 564 (e.g., the masked input image and/or the input image with more or different masked regions). The feature maps from the reference branch are fused to the features in the main branch (e.g., features at the same scale) through Mask Guided Addition (MGA) modules 556-560. This multi-scale reference branch fusion process differs from existing techniques that directly concatenate the low-resolution recovered image and original masked image as the input. This progressive fusion process enables the described system to recover texture details of the image in a more semantically coherent way, especially for large inpainting masks. Data of the reference image 564 is processed by a series of convolutional layers 566-568, with the result of each layer feeding into an MGA module for fusion with the main branch. The MGA modules 556-560 also us the mask data 570 of the input image in the fusion process.

In some examples, the construction process of the output image is described with equation 6 provided in the exemplary equations section below and/or the fusion of data between the main brand and reference branch is described with equation 7 provided in the exemplary equations section below.

Further, in some examples, the P-VQVAE, including the patch-based encoder, the dual codebooks, and/or the MSG decoder, is trained using machine learning techniques. During the training process, to avoid the overall system learning to reconstruct the input image only from a particular reference image, a different reference image is generated by randomly masking some pixels in the input image with another mask (e.g., creating one or more additional masked regions in the input image 302 in addition to the masked region 304). In some examples, this process is described by equation 8 provided in the exemplary equations section below. The unmasked pixels of the reference image are used to recover the corresponding pixels in the reconstructed image, while the latent vectors of the dual codebook are used to recover the pixels masked by both the original mask and the new mask applied to the reference image. In some examples, the loss for training the P-VQVAE is described by equation 9 provided in the exemplary equations section below. In other examples, other methods are used to train the elements of the P-VQVAE without departing from the description.

Figure 6:
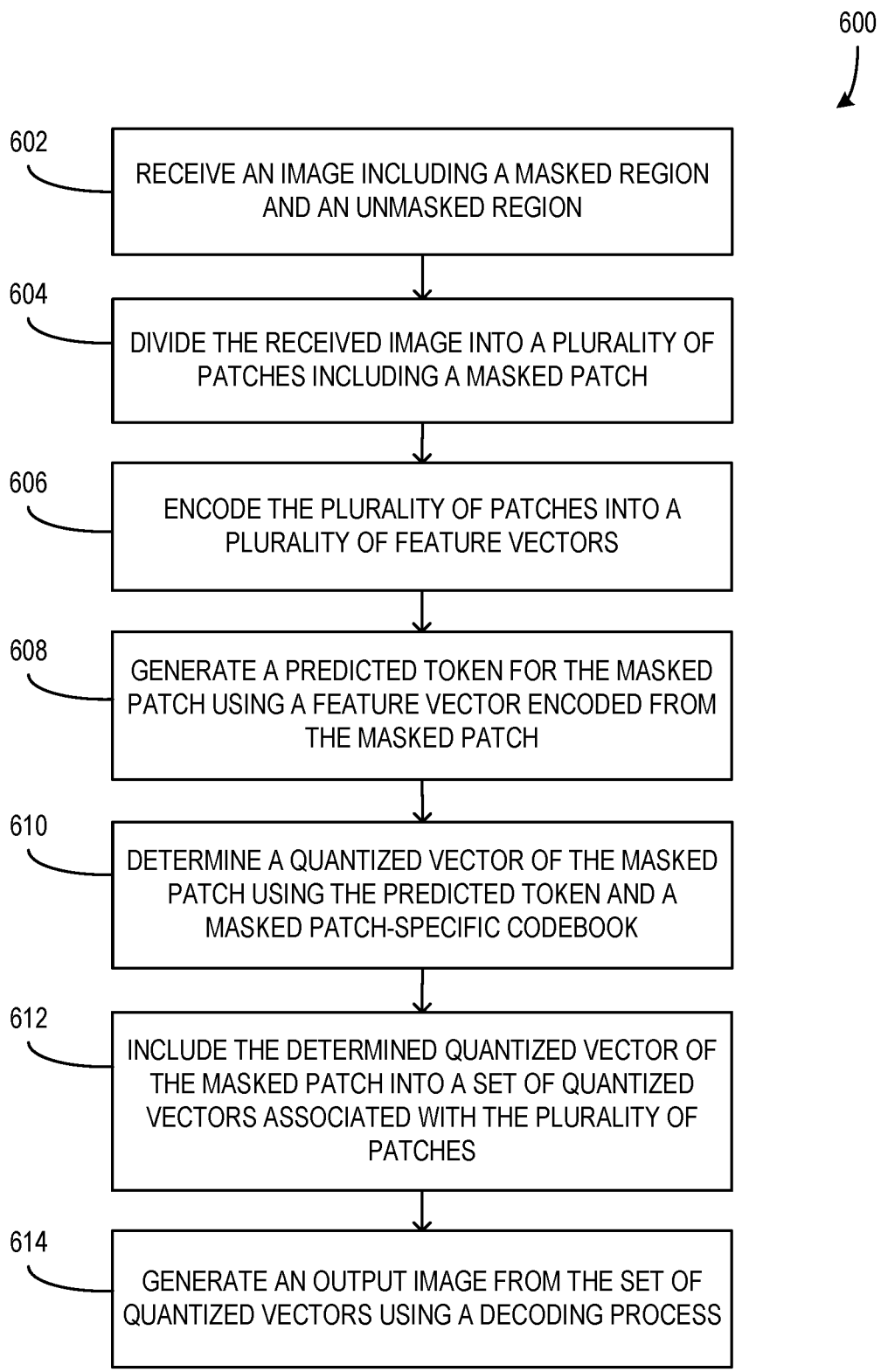
FIG. 6 is a flowchart illustrating a method for generating an output image with an inpainted region from an input image with a masked region.

FIG. 6 is a flowchart illustrating a method 600 for generating an output image 134 with an inpainted region 135 from an input image 102 with a masked region 104. In some examples, the method 600 is executed or otherwise performed in a system such as system 100 of FIG. 1. At 602, an image is received that includes a masked region and an unmasked region. In some examples, the received image includes multiple masked regions and/or unmasked regions.

At 604, the received image is divided into a plurality of patches including a masked patch. In some examples, the patches are non-overlapping patches. Further, in some examples, the plurality of patches includes at least one masked patch and at least one unmasked patch, wherein masked patches in the plurality of patches include at least a portion of a masked region and unmasked patches in the plurality of patches include no portion of a masked region. Additionally, or alternatively, the patches are of equal shapes and sizes (e.g., rectangle or square patches).

At 606, the plurality of patches are encoded into a plurality of feature vectors. In some examples, the encoding is performed using a patch-based encoder such as patch-based encoders 114 and 314 as described herein.

At 608, a predicted token is generated (e.g., by a UQ transformer 124 and/or 224) for the masked patch using a feature vector encoded from the masked patch. In some examples, generating the predicted token is done as part of an iterative predicted token generation process as described herein (e.g., with respect to method 700 below).

At 610, a quantized vector of the masked patch is determined using the predicted token and a masked patch-specific codebook. In some examples, the predicted token is used to find an entry in the codebook and the mapped quantized vector of that entry is determined to be the quantized vector for the associated patch.

At 612, the determined quantized vector of the masked patch is included into a set of quantized vectors associated with the plurality of patches. In some examples, the set of quantized vectors includes quantized vectors associated with unmasked patches that are determined based on an unmasked patch-based codebook in addition to quantized vectors associated with masked patches that are determined based on a masked patch-based codebook. Further, in some examples, the unmasked patch-based codebook and masked patch-based codebook are generated using machine learning using unmasked patch data as training data and masked patch data as training data, respectively.

At 614, an output image is generated from the set of quantized vectors using a decoding process (e.g., by an MSG decoder 132 and/or the decoder of system 500). In some examples, generating the output image includes generating a series of multiple output images. Further, in some examples, the output image is a 2D image such as a digital image or photograph. Alternatively, or additionally, the method 600 is configured to generate 3D output images based on masked 3D input images. In such examples, the method 600 is configured to divide a 3D input image into a series of 3D patches, encode the 3D patches, transform feature vectors of the masked 3D patches using a transformation process to determine predicted tokens, map the predicted tokens to latent vectors, and decode the latent vectors into a 3D output image. The systems configured to execute the method 600 can be trained to perform such operations on 3D images using 3D images as training data in substantially the same way as described herein with respect to 2D images.

In further examples, the method 600 is configured to be performed in real time and/or near real time such that images that make up video frames can be inpainted using the method 600 to repair or reconstruct flawed regions of those images. Such real time or near real time processing is can be applied to movies, live video streams, or even mixed reality, augmented reality, or virtual reality applications using 3D trained systems.

Further, in some examples, the plurality of patches includes an unmasked patch and the method 600 further includes determining a token for the unmasked patch using the unmasked patch-specific codebook and a feature vector encoded from the unmasked patch. Then, a quantized vector of the unmasked patch is determined using the unmasked patch-specific codebook and the determined token, and the determined quantized vector of the unmasked patch is included into the set of quantized vectors associated with the plurality of patches. Generating the output image from the set of quantized vectors further includes inserting the unmasked patch into the output image in a location corresponding to the location of the unmasked patch in the received image.

Additionally, in some examples, the MSG decoder is trained using machine learning. This includes processing quantized vectors associated with an input image using a plurality of deconvolutional layers associated with a set of multiple scales and extracting multi-scale feature maps from a reference image, wherein a feature map of the multi-scale feature maps is extracted for each scale of the set of multiple scales. The extracted multi-scale feature maps are fused with the processed quantized vectors at each scale of the set of multiple scales. Inpainted image data is generated based on the fused multi-scale feature maps and quantized vectors, and the MSG decoder is tuned based on comparison of the generated inpainted image data to corresponding image data of the input image.

Further, in some examples, the UQ transformer is trained using machine learning. This includes generating a set of ground truth feature vectors from an input image, wherein the input image is unmasked, and generating quantized vectors of a subset of the set of ground truth feature vectors using the masked patch-based codebook (e.g., the subset includes ground truth feature vectors chosen at random at a defined rate, such as 30%). The subset of ground truth feature vectors are replaced with the generated quantized vectors in the set of ground truth feature vectors. The modified set of ground truth feature vectors is processed with the UQ transformer, and the UQ transformer is tuned based on the results of the processing.

Figure 7:
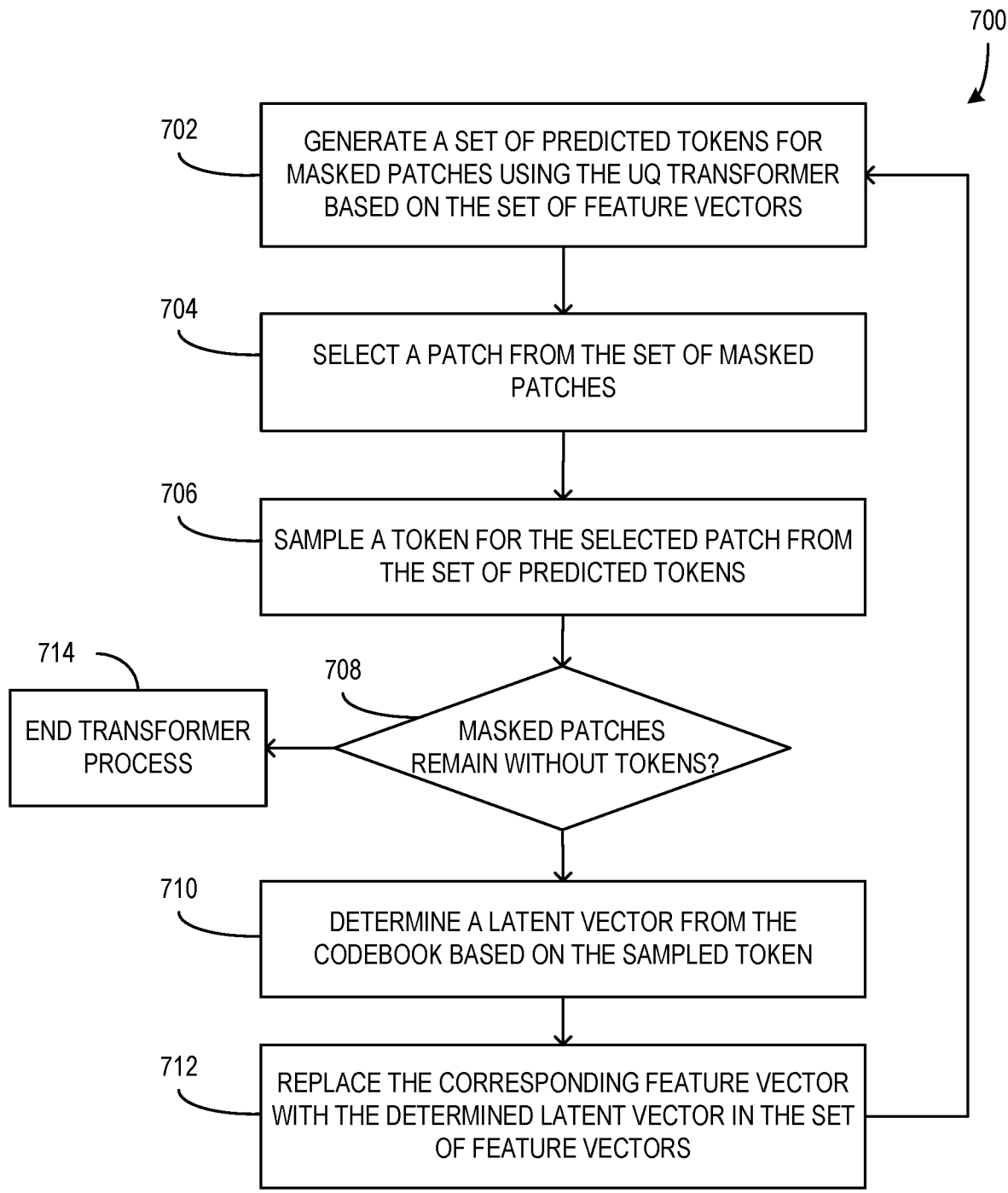
FIG. 7 is a flowchart illustrating a method for iteratively generating predicted tokens from a set of feature vectors associated with masked patches of an image.

FIG. 7 is a flowchart illustrating a method 700 for iteratively generating predicted tokens (e.g., predicted tokens 126 and/or 226) from a set of feature vectors associated with masked patches (e.g., masked feature vectors 118 and/or 218) of an image (e.g., input image 102 and/or 302). At 702, a set of predicted tokens is generated for the masked patches using the UQ transformer and based on the set of feature vectors, and at 704, a patch from the set of masked patches is selected. In some examples, the patch selected from the set of masked patches is selected due to having the highest probability value based on the generated set of predicted tokens. Such a selected patch is used to generate one deterministic inpainting result. In other examples, selecting the patch is done using probability sampling to generate a set of diverse inpainting results. In such examples, the method 700 is performed multiple times to generate the set of multiple diverse results.

At 706, a token for the selected patch is sampled from the set of predicted tokens. In some examples, sampling the token for the selected patch includes using Gibbs sampling or another type of sampling without departing from the description. In some examples where a set of multiple diverse results is being generated, multiple tokens are sampled for a selected patch in order to generate the multiple results.

At 708, if masked patches without tokens remain, the process proceeds to 710. Alternatively, if no masked patches without tokens remain, the process proceeds to 714. In some examples, the masked patches for which tokens have been sampled are tracked, such that they are eliminated from consideration for selection at 704 in later iterations of the process.

At 710, a latent vector is determined from the codebook based on the sampled token and, at 712, the corresponding feature vector is replaced with the determined latent vector in the set of feature vectors and the process returns to 702 to iteratively generate a new set of predicted tokens based at least in part on the determined latent vector in the set of feature vectors. The latent vectors inserted into the set of feature tokens provide additional simulated unmasked patch vector data for later iterations of the process, such that the probability values of masked patches for which tokens have not yet been selected are improved for each iteration.

At 714, the transformer process ends. In some examples, the overall process described herein proceeds with determining the full set of quantized latent vectors based on tokens and then decoding the set of quantized latent vectors with a decoder into an output image.

Exemplary Equations

In some examples, the feature vectors may be formally described using the following equation 1:

$$\hat{f} = \mathcal{E}(\hat{x}) \in \mathbb{R}^{\frac{H}{r} \times \frac{W}{r} \times C} \qquad (1)$$

In the above equation 1, $\hat{f}$ is the set of feature vectors, $\mathcal{E}(.)$ is the encoder function, $\hat{x}$ is the input image in the form of a set of patches 108, H and W are the height and width of the input image, respectively, r is the length of the sides of each patch, and C is the dimensionality of the feature vectors (e.g., set to 256 by default).

In some examples, the process of the UQ transformer 224 may be described by the following equation 2:

$$\hat{p} = T(\hat{f}) \in [0, 1]^{\frac{H}{r} \times \frac{W}{r} \times K} \qquad (2)$$

In the above equation, $\hat{p}$ is the predicted tokens 226, $T(.)$ is the transformer function of the UQ transformer 224, and K is the quantity of latent vectors in the dual codebook 227. The [0, 1] represents that the transformer function is applied only to generate predicted tokens 226 for the masked feature vectors and not for the unmasked feature vectors. In some examples, the transformer function uses all of the feature vectors to generate the predicted tokens 226 (e.g., generation of a predicted token 226 for one feature vector is dependent on other feature vectors of the image).

In some examples, the ground truth tokens for x may be represented by the following equation 3:

$$t=I(\epsilon(x),e,e',O(m^\downarrow)) \quad (3)$$

In the above equation, t is the ground truth tokens, I(.) is a function that obtains tokens for feature vectors provided in its first argument, e is the unmasked codebook of the dual codebook, e' is the masked codebook of the dual codebook, O(.) is a function that sets all values in the given argument to 1, and $m^\downarrow$ is the indicator mask that indicates whether a patch of the associated image is a masked patch or an unmasked patch.

In some examples, the UQ transformer 224 may be trained with a cross-entropy loss by fixing the encoder according to the following equation 4:

$$L_{trans} = \frac{-1}{\sum_{i,j} 1 - m_{i,j}^\downarrow} \sum_{i,j} (1 - m_{i,j}^\downarrow) \log \hat{p}_{i,j,t_{i,j}} \quad (4)$$

Further, in order to make the training stage consistent with the inference stage (e.g., the runtime stage), where only the quantized vectors (e.g., quantized latent vectors 130) can be obtained for masked patches, the feature vectors provided to the transformer 224 during training are randomly quantized to latent vectors in the dual codebook 227 (e.g., with a probability of 0.3 or another selected probability value) before providing the vectors to the transformer 224 during training.

In some examples, the feature vector $\hat{f}_{i,j}$ may be quantized or otherwise mapped to a latent vector of the dual codebook 427 using the below equation 5:

$$\begin{cases} e_k \text{ where } k = \operatorname{argmin}_l \|\hat{f}_{i,j} \ominus e_l\|_2, \text{ if } m_{i,j}^\downarrow = 1, \\ e_k' \text{ where } k = \operatorname{argmin}_l \|\hat{f}_{i,j} \ominus e_l'\|, \text{ else,} \end{cases} \quad (5)$$

In the above equation, $\ominus$ denotes the operation of elementwise subtraction. For each feature vector, it is compared to the latent vectors of either the masked or unmasked codebooks, based on the associated indicator mask value. The latent vector that is found to be closest to the feature vector based on the elementwise subtraction operation is the resulting latent vector 430. Further, let $\hat{e} \in$ $$\mathbb{R}^{\frac{H}{r} \times \frac{W}{r} \times C}$$

be the quantized latent vectors 430 and $$\hat{t} = I(\hat{f}, e, e', m^\downarrow) \in \mathbb{N}^{\frac{H}{r} \times \frac{W}{r}}$$

be the tokens 422 for feature vectors $\hat{f}$, where $I(\hat{f}, e, e', m^\downarrow)$ represents the function that gets tokens for the first argument (e.g., a function that obtains indices (tokens) of the quantized latent vectors in ê from in the dual codebook 427).

In some examples, the construction process of the output image may be described with the following equation 6:

$$\hat{x}' = D(\hat{e}', m, \hat{x}) \quad (6)$$

In the above equation 6, $\hat{x}'$ is the output image 534 with the inpainted region replacing the masked region of the input image, $\hat{e}'$ is the quantized latent vectors 530 retrieved from the dual codebook, m is mask data of the input image, and $\hat{x}$ is the input image. D(., ., .) is the decoder function of the MSG decoder as described herein.

In some examples, the fusion of data between the main branch and the reference branch may be described with the following equation 7:

$$\hat{x}^{l,l-1} = \operatorname{Deconv}((1-m^{\downarrow,l}) \otimes \hat{e}^{l,l} + m^{\downarrow,l} \otimes \hat{f}^{R,l}) \quad (7)$$

In the above equation 7, $\hat{e}^{l,l-1}$ and $\hat{f}^{R,l}$ are features with spatial size $$\frac{H}{2^l} \times \frac{W}{2^l}$$

from the main branch and reference branch, respectively. $m^{\downarrow,l}$ is the indicator mask data obtained from the mask data m for the corresponding spatial size.

In some examples, the reconstructed image may be represented by the following equation 8:

$$\hat{x}^R = D(\hat{e}, m \otimes m', \hat{x} \otimes m') \quad (8)$$

In the above equation 8, $\hat{x}^R$ is the reconstructed image, D(.) is the decoder function (e.g., of the MSG decoder 132) as described herein, ê is the dual codebook, m is the original mask of the input image (e.g., the masked region 304), m' is the newly generated mask of the reference image, and $\hat{x}$ is the input image (which is combined with m' to represent the new mask being applied to the input image).

In some examples, the loss for training the P-VQVAE may be represented in the following equation 9:

$$L_{vae} = \mathcal{L}_{rec}(\hat{x}, \hat{x}^R) + \|sg[\hat{f}] \ominus \hat{e}\mu_2^2 + \beta\|sg[\hat{e}] \ominus \hat{f}\|_2^2 \quad (9)$$

In the above equation 9, $L_{vae}$ is the loss for training the P-VQVAE and $\mathcal{L}_{rec}(\hat{x}, \hat{x}^R)$ is a function to measure the difference between input images and output images or reconstructed images (including the L1 loss between pixel values in the two images and the gradients of the two images, the adversarial loss obtained by a discriminator network, as well as perceptual loss and style loss between the two images). The sg[.] refers to a stop-gradient operation that blocks gradients from flowing into its argument. β is a weight for balancing the process (e.g., it is set to 0.25 or another weight value). In some examples, the second term in the equation 9 is replaced by an Exponential Moving Average (EMA) to optimize the vectors of the dual codebook (e.g., dual codebooks 127, 227).

Exemplary Operating Environment

Figure 8:
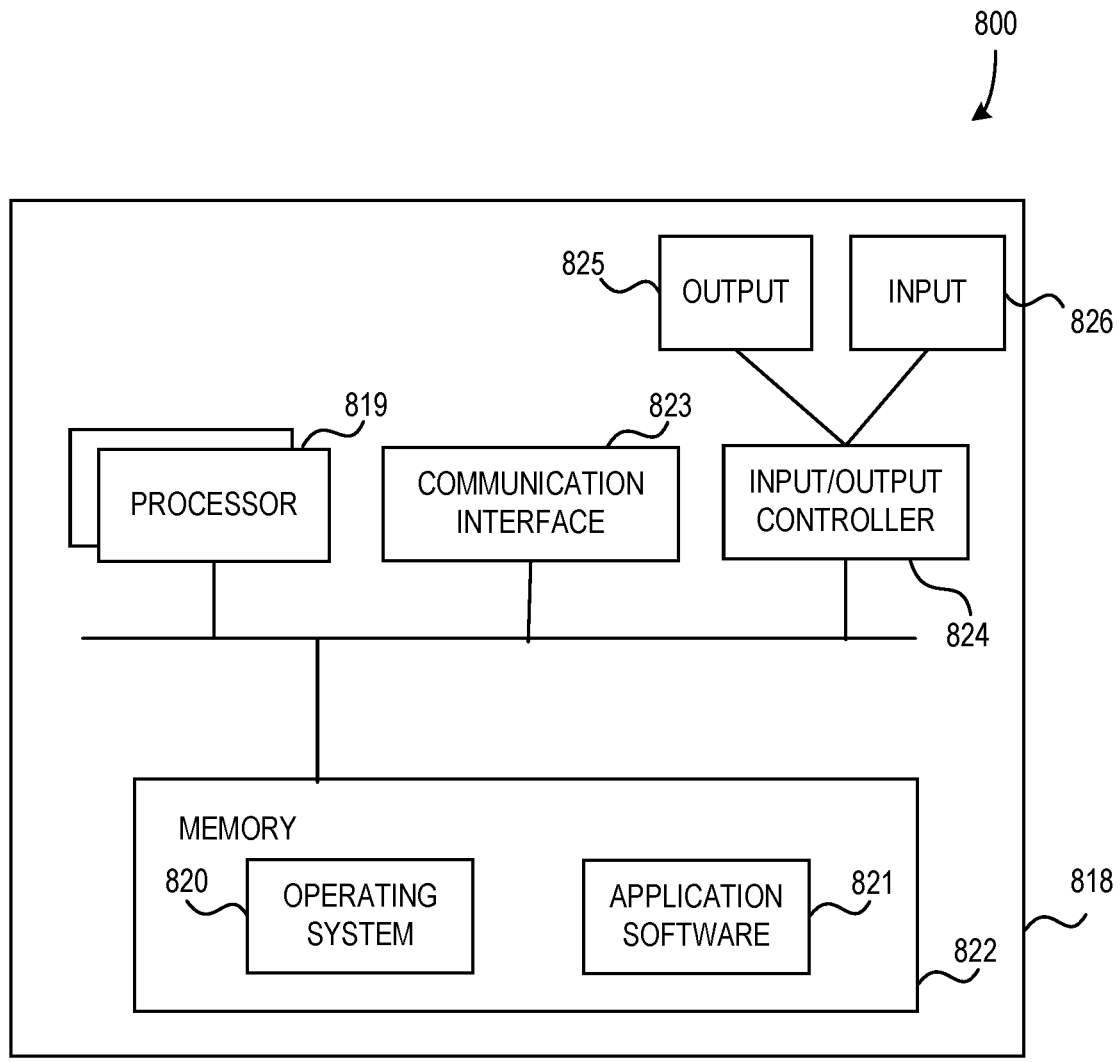
FIG. 8 illustrates an example computing apparatus as a functional block diagram.

The present disclosure is operable with a computing apparatus according to an embodiment as a functional block diagram 800 in FIG. 8. In an example, components of a computing apparatus 818 are implemented as a part of an electronic device according to one or more embodiments described in this specification. The computing apparatus 818 comprises one or more processors 819 which may be microprocessors, controllers, or any other suitable type of processors for processing computer executable instructions to control the operation of the electronic device. Alternatively, or in addition, the processor 819 is any technology capable of executing logic or instructions, such as a hard-coded machine. In some examples, platform software comprising an operating system 820 or any other suitable platform software is provided on the apparatus 818 to enable application software 821 to be executed on the device. In some examples, generating an inpainted image from a masked image using a P-VQVAE and UQ transformer as described herein is accomplished by software, hardware, and/or firmware.

In some examples, computer executable instructions are provided using any computer-readable media that are accessible by the computing apparatus 818. Computer-readable media include, for example, computer storage media such as a memory 822 and communications media. Computer storage media, such as a memory 822, include volatile and non-volatile, removable, and non-removable media implemented in any method or technology for storage of information such as computer readable instructions, data structures, program modules or the like. Computer storage media include, but are not limited to, Random Access Memory (RAM), Read-Only Memory (ROM), Erasable Programmable Read-Only Memory (EPROM), Electrically Erasable Programmable Read-Only Memory (EEPROM), persistent memory, phase change memory, flash memory or other memory technology, Compact Disk Read-Only Memory (CD-ROM), digital versatile disks (DVD) or other optical storage, magnetic cassettes, magnetic tape, magnetic disk storage, shingled disk storage or other magnetic storage devices, or any other non-transmission medium that can be used to store information for access by a computing apparatus. In contrast, communication media may embody computer readable instructions, data structures, program modules, or the like in a modulated data signal, such as a carrier wave, or other transport mechanism. As defined herein, computer storage media do not include communication media. Therefore, a computer storage medium should not be interpreted to be a propagating signal per se. Propagated signals per se are not examples of computer storage media. Although the computer storage medium (the memory 822) is shown within the computing apparatus 818, it will be appreciated by a person skilled in the art, that, in some examples, the storage is distributed or located remotely and accessed via a network or other communication link (e.g., using a communication interface 823).

Further, in some examples, the computing apparatus 818 comprises an input/output controller 824 configured to output information to one or more output devices 825, for example a display or a speaker, which are separate from or integral to the electronic device. Additionally, or alternatively, the input/output controller 824 is configured to receive and process an input from one or more input devices 826, for example, a keyboard, a microphone, or a touchpad. In one example, the output device 825 also acts as the input device. An example of such a device is a touch sensitive display. The input/output controller 824 may also output data to devices other than the output device, e.g., a locally connected printing device. In some examples, a user provides input to the input device(s) 826 and/or receive output from the output device(s) 825.

The functionality described herein can be performed, at least in part, by one or more hardware logic components. According to an embodiment, the computing apparatus 818 is configured by the program code when executed by the processor 819 to execute the embodiments of the operations and functionality described. Alternatively, or in addition, the functionality described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Program-specific Standard Products (ASSPs), System-on-a-chip systems (SOCs), Complex Programmable Logic Devices (CPLDs), Graphics Processing Units (GPUs).

At least a portion of the functionality of the various elements in the figures may be performed by other elements in the figures, or an entity (e.g., processor, web service, server, application program, computing device, etc.) not shown in the figures.

Although described in connection with an exemplary computing system environment, examples of the disclosure are capable of implementation with numerous other general purpose or special purpose computing system environments, configurations, or devices.

Examples of well-known computing systems, environments, and/or configurations that are suitable for use with aspects of the disclosure include, but are not limited to, mobile or portable computing devices (e.g., smartphones), personal computers, server computers, hand-held (e.g., tablet) or laptop devices, multiprocessor systems, gaming consoles or controllers, microprocessor-based systems, set top boxes, programmable consumer electronics, mobile telephones, mobile computing and/or communication devices in wearable or accessory form factors (e.g., watches, glasses, headsets, or earphones), network PCs, minicomputers, mainframe computers, distributed computing environments that include any of the above systems or devices, and the like. In general, the disclosure is operable with any device with processing capability such that it can execute instructions such as those described herein. Such systems or devices accept input from the user in any way, including from input devices such as a keyboard or pointing device, via gesture input, proximity input (such as by hovering), and/or via voice input.

Examples of the disclosure may be described in the general context of computer-executable instructions, such as program modules, executed by one or more computers or other devices in software, firmware, hardware, or a combination thereof. The computer-executable instructions may be organized into one or more computer-executable components or modules. Generally, program modules include, but are not limited to, routines, programs, objects, components, and data structures that perform particular tasks or implement particular abstract data types. Aspects of the disclosure may be implemented with any number and organization of such components or modules. For example, aspects of the disclosure are not limited to the specific computer-executable instructions, or the specific components or modules illustrated in the figures and described herein. Other examples of the disclosure include different computer-executable instructions or components having more or less functionality than illustrated and described herein.

In examples involving a general-purpose computer, aspects of the disclosure transform the general-purpose computer into a special-purpose computing device when configured to execute the instructions described herein.

An example system comprises: at least one processor; and at least one memory comprising computer program code, the at least one memory and the computer program code configured to, with the at least one processor, cause the at least one processor to: receive an image including a masked region and an unmasked region; divide the received image into a plurality of patches including a masked patch, wherein the masked patch includes at least a portion of the masked region of the image; encode the plurality of patches into a plurality of feature vectors, wherein each patch is encoded to a feature vector; generate a predicted token for the masked patch using a feature vector encoded from the masked patch, wherein the feature vector is unquantized; determine a quantized vector of the masked patch using at least the generated predicted token; include the determined quantized vector of the masked patch into a set of quantized vectors associated with the plurality of patches; and generate an output image from the set of quantized vectors, whereby the output image includes the unmasked region of the received image and image inpainting in a region corresponding to the masked region in the received image.

An example computerized method comprises: receiving, by a processor, an image including a masked region and an unmasked region; dividing, by the processor, the received image into a plurality of patches including a masked patch, wherein the masked patch includes at least a portion of the masked region of the image; encoding, by the processor, the plurality of patches into a plurality of feature vectors, wherein each patch is encoded to a feature vector; generating, by the processor, a predicted token for the masked patch using a feature vector encoded from the masked patch, wherein the feature vector is unquantized; determining, by the processor, a quantized vector of the masked patch using at least the generated predicted token; including, by the processor, the determined quantized vector of the masked patch into a set of quantized vectors associated with the plurality of patches; and generating, by the processor, an output image from the set of quantized vectors, whereby the output image includes image inpainting in a region corresponding to the masked region in the received image.

One or more computer storage media having computer-executable instructions that, upon execution by a processor, cause the processor to at least: receive an image including a masked region and an unmasked region; divide the received image into a plurality of patches including a masked patch, wherein the masked patch includes at least a portion of the masked region of the image; encode the plurality of patches into a plurality of feature vectors, wherein each patch is encoded to a feature vector; generate a predicted token for the masked patch using a feature vector encoded from the masked patch, wherein the feature vector is unquantized; determine a quantized vector of the masked patch using at least the generated predicted token; include the determined quantized vector of the masked patch into a set of quantized vectors associated with the plurality of patches; and generate an output image from the set of quantized vectors, whereby the output image includes image inpainting in a region corresponding to the masked region in the received image.

Alternatively, or in addition to the other examples described herein, examples include any combination of the following:
wherein determining the quantized vector of the masked patch further uses a masked patch-specific codebook with the generated predicted token; wherein the plurality of patches further includes an unmasked patch, wherein the unmasked patch includes no portion of the masked region of the image; wherein the computerized method further comprises: determining a token for the unmasked patch using an unmasked patch-specific codebook and a feature vector of the plurality of feature vectors encoded from the unmasked patch; determining a quantized vector of the unmasked patch using the unmasked patch-specific codebook and the determined token for the unmasked patch; including the determined quantized vector of the unmasked patch into the set of quantized vectors associated with the plurality of patches; and wherein generating the output image from the set of quantized vectors further includes inserting the unmasked patch into the output image in a location corresponding to a location of the unmasked patch in the received image.

wherein the masked patch-specific codebook includes a map of token values to quantized latent vectors that is generated using machine learning with masked patch data used as training data; and wherein the unmasked patch-specific codebook includes a map of token values to quantized latent vectors that is generated using machine learning with unmasked patch data used as training data.

wherein the plurality of patches includes a plurality of masked patches; and wherein generating the predicted token for the masked patch using the feature vector encoded from the masked patch further includes: generating a first plurality of predicted tokens for the plurality of masked patches using feature vectors of the plurality of masked patches in the plurality of feature vectors; selecting a first token of the generated first plurality of predicted tokens that has a highest probability value of the generated first plurality of predicted tokens, wherein the first token is associated with a first masked patch of the plurality of masked patches; determining a quantized vector associated with the selected first token; replacing a feature vector from which the first token was generated with the determined quantized vector associated with the selected first token in the plurality of feature vectors; generating a second plurality of predicted tokens for the plurality of masked patches using the plurality of feature vectors with the determined quantized vector associated with the selected first token with which the feature vector from which the first token was generated was replaced; and selecting a second token of the generated second plurality of predicted tokens that has a highest probability value of the generated second plurality of predicted tokens, wherein the second token is associated with a second masked patch of the plurality of masked patches.

wherein selecting the first token of the generated first plurality of predicted tokens further includes sampling the first token from the generated first plurality of predicted tokens using Gibbs sampling.

further comprising: training the MSG decoder using machine learning, the training including: processing quantized vectors associated with an input image using a plurality of deconvolutional layers associated with a set of multiple scales; extracting multi-scale feature maps from a reference image, wherein a feature map of the multi-scale feature maps is extracted for each scale of the set of multiple scales; fusing the extracted multi-scale feature maps with the processed quantized vectors at each scale of the set of multiple scales; generating inpainted image data based on the fused multi-scale feature maps and quantized vectors; and tuning the MSG decoder based on comparison of the generated inpainted image data to corresponding image data of the input image.

further comprising: training a transformer to generate the predicted token for the masked patch using machine learning, the training including: generating a set of ground truth feature vectors from an input image, wherein the input image is unmasked; generating quantized vectors of a subset of the set of ground truth feature vectors using a masked patch-based codebook;

replacing the subset of ground truth feature vectors with the generated quantized vectors in the set of ground truth feature vectors; processing the set of ground truth feature vectors with the transformer; and tuning the transformer based on results of processing the set of ground truth feature vectors with the transformer.

Any range or device value given herein may be extended or altered without losing the effect sought, as will be apparent to the skilled person.

Examples have been described with reference to data monitored and/or collected from the users (e.g., user identity data with respect to profiles). In some examples, notice is provided to the users of the collection of the data (e.g., via a dialog box or preference setting) and users are given the opportunity to give or deny consent for the monitoring and/or collection. The consent takes the form of opt-in consent or opt-out consent.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

The embodiments illustrated and described herein as well as embodiments not specifically described herein but within the scope of aspects of the claims constitute an exemplary means for receiving, by a processor, an image including a masked region and an unmasked region; exemplary means for dividing, by the processor, the received image into a plurality of patches including a masked patch, wherein the masked patch includes at least a portion of the masked region of the image; exemplary means for encoding, by the processor, the plurality of patches into a plurality of feature vectors, wherein each patch is encoded to a feature vector; exemplary means for generating, by the processor, using a transformer, a predicted token for the masked patch using a feature vector encoded from the masked patch, wherein the transformer is configured to generate predicted tokens from unquantized feature vectors; exemplary means for determining, by the processor, a quantized vector of the masked patch using generated predicted token and a masked patch-specific codebook; exemplary means for including, by the processor, the determined quantized vector of the masked patch into a set of quantized vectors associated with the plurality of patches; and exemplary means for generating, by the processor, an output image from the set of quantized vectors using a decoder, whereby the output image includes image inpainting in a region corresponding to the masked region in the received image.

The term "comprising" is used in this specification to mean including the feature(s) or act(s) followed thereafter, without excluding the presence of one or more additional features or acts.

In some examples, the operations illustrated in the figures are implemented as software instructions encoded on a computer readable medium, in hardware programmed or designed to perform the operations, or both. For example, aspects of the disclosure are implemented as a system on a chip or other circuitry including a plurality of interconnected, electrically conductive elements.

The order of execution or performance of the operations in examples of the disclosure illustrated and described herein is not essential, unless otherwise specified. That is, the operations may be performed in any order, unless otherwise specified, and examples of the disclosure may include additional or fewer operations than those disclosed herein. For example, it is contemplated that executing or performing a particular operation before, contemporaneously with, or after another operation is within the scope of aspects of the disclosure.

When introducing elements of aspects of the disclosure or the examples thereof, the articles "a," "an," "the," and "said" are intended to mean that there are one or more of the elements. The terms "comprising," "including," and "having" are intended to be inclusive and mean that there may be additional elements other than the listed elements. The term "exemplary" is intended to mean "an example of." The phrase "one or more of the following: A, B, and C" means "at least one of A and/or at least one of B and/or at least one of C."

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

What is claimed is:

1. A system comprising:
   at least one processor; and
   at least one memory comprising computer program code, the at least one memory and the computer program code configured to, with the at least one processor, cause the at least one processor to:
   receive an image including a masked region and an unmasked region;
   divide the received image into a plurality of patches including a masked patch, wherein the masked patch includes at least a portion of the masked region of the image;
   encode the plurality of patches into a plurality of feature vectors, wherein each patch is encoded to a feature vector;
   generate a predicted token for the masked patch using a feature vector encoded from the masked patch, wherein the feature vector is unquantized;
   determine a quantized vector of the masked patch using at least the generated predicted token;
   include the determined quantized vector of the masked patch into a set of quantized vectors associated with the plurality of patches; and
   generate an output image from the set of quantized vectors, whereby the output image includes the unmasked region of the received image and image inpainting in a region corresponding to the masked region in the received image.

2. The system of claim 1, wherein determining the quantized vector of the masked patch further uses a masked patch-specific codebook with the generated predicted token;
   wherein the plurality of patches further includes an unmasked patch, wherein the unmasked patch includes no portion of the masked region of the image; and wherein the at least one memory and the computer program code is configured to, with the at least one processor, further cause the at least one processor to:

determine a token for the unmasked patch using an unmasked patch-specific codebook and a feature vector of the plurality of feature vectors encoded from the unmasked patch;

determine a quantized vector of the unmasked patch using the unmasked patch-specific codebook and the determined token for the unmasked patch;

include the determined quantized vector of the unmasked patch into the set of quantized vectors associated with the plurality of patches; and wherein generating the output image from the set of quantized vectors further includes inserting the unmasked patch into the output image in a location corresponding to a location of the unmasked patch in the received image.

3. The system of claim 2, wherein the masked patch-specific codebook includes a map of token values to quantized latent vectors that is generated using machine learning with masked patch data used as training data; and wherein the unmasked patch-specific codebook includes a map of token values to quantized latent vectors that is generated using machine learning with unmasked patch data used as training data.

4. The system of claim 1, wherein the plurality of patches includes a plurality of masked patches; and wherein generating the predicted token for the masked patch using the feature vector encoded from the masked patch further includes:

generating a first plurality of predicted tokens for the plurality of masked patches using feature vectors of the plurality of masked patches in the plurality of feature vectors;

selecting a first token of the generated first plurality of predicted tokens that has a highest probability value of the generated first plurality of predicted tokens, wherein the first token is associated with a first masked patch of the plurality of masked patches;

determining a quantized vector associated with the selected first token;

replacing a feature vector from which the first token was generated with the determined quantized vector associated with the selected first token in the plurality of feature vectors;

generating a second plurality of predicted tokens for the plurality of masked patches using the plurality of feature vectors with the determined quantized vector associated with the selected first token with which the feature vector from which the first token was generated was replaced; and selecting a second token of the generated second plurality of predicted tokens that has a highest probability value of the generated second plurality of predicted tokens, wherein the second token is associated with a second masked patch of the plurality of masked patches.

5. The system of claim 4, wherein selecting the first token of the generated first plurality of predicted tokens further includes sampling the first token from the generated first plurality of predicted tokens using Gibbs sampling.

6. The system of claim 1, wherein the at least one memory and the computer program code is configured to, with the at least one processor, further cause the at least one processor to:

train a decoder to generate the output image from the set of quantized vectors using machine learning, the training including:

processing quantized vectors associated with an input image using a plurality of deconvolutional layers associated with a set of multiple scales;

extracting multi-scale feature maps from a reference image, wherein a feature map of the multi-scale feature maps is extracted for each scale of the set of multiple scales;

fusing the extracted multi-scale feature maps with the processed quantized vectors at each scale of the set of multiple scales;

generating inpainted image data based on the fused multi-scale feature maps and quantized vectors; and tuning the decoder based on comparison of the generated inpainted image data to corresponding image data of the input image.

7. The system of claim 1, wherein the at least one memory and the computer program code is configured to, with the at least one processor, further cause the at least one processor to:

train a transformer to generate the predicted token for the masked patch using machine learning, the training including:

generating a set of ground truth feature vectors from an input image, wherein the input image is unmasked;

generating quantized vectors of a subset of the set of ground truth feature vectors using a masked patch-based codebook;

replacing the subset of ground truth feature vectors with the generated quantized vectors in the set of ground truth feature vectors;

processing the set of ground truth feature vectors with the transformer; and tuning the transformer based on results of processing the set of ground truth feature vectors with the transformer.

8. A computerized method comprising:

receiving, by a processor, an image including a masked region and an unmasked region;

dividing, by the processor, the received image into a plurality of patches including a masked patch, wherein the masked patch includes at least a portion of the masked region of the image;

encoding, by the processor, the plurality of patches into a plurality of feature vectors, wherein each patch is encoded to a feature vector;

generating, by the processor, a predicted token for the masked patch using a feature vector encoded from the masked patch, wherein the feature vector is unquantized;

determining, by the processor, a quantized vector of the masked patch using at least the generated predicted token;

including, by the processor, the determined quantized vector of the masked patch into a set of quantized vectors associated with the plurality of patches; and generating, by the processor, an output image from the set of quantized vectors, whereby the output image includes image inpainting in a region corresponding to the masked region in the received image.

9. The computerized method of claim 8, wherein determining the quantized vector of the masked patch further uses a masked patch-specific codebook with the generated predicted token;

wherein the plurality of patches further includes an unmasked patch, wherein the unmasked patch includes no portion of the masked region of the image; and wherein the computerized method further comprises:

determining a token for the unmasked patch using an unmasked patch-specific codebook and a feature vector of the plurality of feature vectors encoded from the unmasked patch;

determining a quantized vector of the unmasked patch using the unmasked patch-specific codebook and the determined token for the unmasked patch;

including the determined quantized vector of the unmasked patch into the set of quantized vectors associated with the plurality of patches; and wherein generating the output image from the set of quantized vectors further includes inserting the unmasked patch into the output image in a location corresponding to a location of the unmasked patch in the received image.

10. The computerized method of claim 9, wherein the masked patch-specific codebook includes a map of token values to quantized latent vectors that is generated using machine learning with masked patch data used as training data; and wherein the unmasked patch-specific codebook includes a map of token values to quantized latent vectors that is generated using machine learning with unmasked patch data used as training data.

11. The computerized method of claim 8, wherein the plurality of patches includes a plurality of masked patches; and wherein generating the predicted token for the masked patch using the feature vector encoded from the masked patch further includes:

generating a first plurality of predicted tokens for the plurality of masked patches using feature vectors of the plurality of masked patches in the plurality of feature vectors;

selecting a first token of the generated first plurality of predicted tokens that has a highest probability value of the generated first plurality of predicted tokens, wherein the first token is associated with a first masked patch of the plurality of masked patches;

determining a quantized vector associated with the selected first token;

replacing a feature vector from which the first token was generated with the determined quantized vector associated with the selected first token in the plurality of feature vectors;

generating a second plurality of predicted tokens for the plurality of masked patches using the plurality of feature vectors with the determined quantized vector associated with the selected first token with which the feature vector from which the first token was generated was replaced; and selecting a second token of the generated second plurality of predicted tokens that has a highest probability value of the generated second plurality of predicted tokens, wherein the second token is associated with a second masked patch of the plurality of masked patches.

12. The computerized method of claim 11, wherein selecting the first token of the generated first plurality of predicted tokens further includes sampling the first token from the generated first plurality of predicted tokens using Gibbs sampling.

13. The computerized method of claim 8, further comprising:

training a decoder to generate the output image from the set of quantized vectors using machine learning, the training including:

processing quantized vectors associated with an input image using a plurality of deconvolutional layers associated with a set of multiple scales;

extracting multi-scale feature maps from a reference image, wherein a feature map of the multi-scale feature maps is extracted for each scale of the set of multiple scales;

fusing the extracted multi-scale feature maps with the processed quantized vectors at each scale of the set of multiple scales;

generating inpainted image data based on the fused multi-scale feature maps and quantized vectors; and tuning the decoder based on comparison of the generated inpainted image data to corresponding image data of the input image.

14. The computerized method of claim 8, further comprising:

training a transformer to generate the predicted token for the masked patch using machine learning, the training including:

generating a set of ground truth feature vectors from an input image, wherein the input image is unmasked;

generating quantized vectors of a subset of the set of ground truth feature vectors using a masked patch-based codebook;

replacing the subset of ground truth feature vectors with the generated quantized vectors in the set of ground truth feature vectors;

processing the set of ground truth feature vectors with the transformer; and tuning the transformer based on results of processing the set of ground truth feature vectors with the transformer.

15. One or more non-transitory computer storage media having computer-executable instructions that, upon execution by a processor, cause the processor to at least:

receive an image including a masked region and an unmasked region;

divide the received image into a plurality of patches including a masked patch, wherein the masked patch includes at least a portion of the masked region of the image;

encode the plurality of patches into a plurality of feature vectors, wherein each patch is encoded to a feature vector;

generate a predicted token for the masked patch using a feature vector encoded from the masked patch, wherein the feature vector is unquantized;

determine a quantized vector of the masked patch using at least the generated predicted token;

include the determined quantized vector of the masked patch into a set of quantized vectors associated with the plurality of patches; and generate an output image from the set of quantized vectors, whereby the output image includes image inpainting in a region corresponding to the masked region in the received image.

16. The one or more computer storage media of claim 15, wherein determining the quantized vector of the masked patch further uses a masked patch-specific codebook with the generated predicted token;

wherein the plurality of patches further includes an unmasked patch, wherein the unmasked patch includes no portion of the masked region of the image; and wherein the computer-executable instructions, upon execution by a processor, further cause the processor to at least:
  determine a token for the unmasked patch using an unmasked patch-specific codebook and a feature vector of the plurality of feature vectors encoded from the unmasked patch;
  determine a quantized vector of the unmasked patch using the unmasked patch-specific codebook and the determined token for the unmasked patch;
  include the determined quantized vector of the unmasked patch into the set of quantized vectors associated with the plurality of patches; and
  wherein generating the output image from the set of quantized vectors further includes inserting the unmasked patch into the output image in a location corresponding to a location of the unmasked patch in the received image.

17. The one or more computer storage media of claim 16, wherein the masked patch-specific codebook includes a map of token values to quantized latent vectors that is generated using machine learning with masked patch data used as training data; and
  wherein the unmasked patch-specific codebook includes a map of token values to quantized latent vectors that is generated using machine learning with unmasked patch data used as training data.

18. The one or more computer storage media of claim 15, wherein the plurality of patches includes a plurality of masked patches; and
  wherein generating the predicted token for the masked patch using the feature vector encoded from the masked patch further includes:
  generating a first plurality of predicted tokens for the plurality of masked patches using feature vectors of the plurality of masked patches in the plurality of feature vectors;
  selecting a first token of the generated first plurality of predicted tokens that has a highest probability value of the generated first plurality of predicted tokens, wherein the first token is associated with a first masked patch of the plurality of masked patches;
  determining a quantized vector associated with the selected first token;
  replacing a feature vector from which the first token was generated with the determined quantized vector associated with the selected first token in the plurality of feature vectors;
  generating a second plurality of predicted tokens for the plurality of masked patches using the plurality of feature vectors with the determined quantized vector associated with the selected first token with which the feature vector from which the first token was generated was replaced; and
  selecting a second token of the generated second plurality of predicted tokens that has a highest probability value of the generated second plurality of predicted tokens, wherein the second token is associated with a second masked patch of the plurality of masked patches.

19. The one or more computer storage media of claim 15, wherein the computer-executable instructions, upon execution by a processor, further cause the processor to at least:
  train a decoder to generate the output image from the set of quantized vectors using machine learning, the training including:
  processing quantized vectors associated with an input image using a plurality of deconvolutional layers associated with a set of multiple scales;
  extracting multi-scale feature maps from a reference image, wherein a feature map of the multi-scale feature maps is extracted for each scale of the set of multiple scales;
  fusing the extracted multi-scale feature maps with the processed quantized vectors at each scale of the set of multiple scales;
  generating inpainted image data based on the fused multi-scale feature maps and quantized vectors; and
  tuning the decoder based on comparison of the generated inpainted image data to corresponding image data of the input image.

20. The one or more computer storage media of claim 15, wherein the computer-executable instructions, upon execution by a processor, further cause the processor to at least:
  train a transformer to generate the predicted token for the masked patch using machine learning, the training including:
  generating a set of ground truth feature vectors from an input image, wherein the input image is unmasked;
  generating quantized vectors of a subset of the set of ground truth feature vectors using a masked patch-based codebook;
  replacing the subset of ground truth feature vectors with the generated quantized vectors in the set of ground truth feature vectors;
  processing the set of ground truth feature vectors with the transformer; and
  tuning the transformer based on results of processing the set of ground truth feature vectors with the transformer.

* * * * *